(12) United States Patent
Manabe et al.

(10) Patent No.: US 7,627,470 B2
(45) Date of Patent: Dec. 1, 2009

(54) SPEAKING PERIOD DETECTION DEVICE, VOICE RECOGNITION PROCESSING DEVICE, TRANSMISSION SYSTEM, SIGNAL LEVEL CONTROL DEVICE AND SPEAKING PERIOD DETECTION METHOD

(75) Inventors: Hiroyuki Manabe, Chiyoda-ku (JP); Akira Hiraiwa, Chiyoda-ku (JP); Yumiko Hiraiwa, legal representative, Chiyoda-ku (JP); Kouki Hayashi, Chiyoda-ku (JP); Toshiaki Sugimura, Chiyoda-ku (JP); Toshio Miki, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 776 days.

(21) Appl. No.: 10/939,566

(22) Filed: Sep. 14, 2004

(65) Prior Publication Data

US 2005/0102134 A1    May 12, 2005

(30) Foreign Application Priority Data

Sep. 19, 2003  (JP)  ............................. 2003-327843
Aug. 30, 2004  (JP)  ............................. 2004-250792

(51) Int. Cl.
*G10L 15/00*  (2006.01)
*G10L 21/00*  (2006.01)
*A61F 5/58*   (2006.01)
*A61B 5/04*   (2006.01)

(52) U.S. Cl. .................... 704/231; 600/23; 600/382; 704/270

(58) Field of Classification Search .................. 600/23, 600/382
See application file for complete search history.

(56) References Cited

U.S. PATENT DOCUMENTS

| | | | | |
|---|---|---|---|---|
| 5,027,406 A | * | 6/1991 | Roberts et al. | 704/244 |
| 5,752,227 A | * | 5/1998 | Lyberg | 704/235 |
| 5,794,203 A | * | 8/1998 | Kehoe | 704/271 |
| 6,055,501 A | * | 4/2000 | MacCaughelty | 704/272 |

(Continued)

FOREIGN PATENT DOCUMENTS

CN    1442802 A    9/2003

(Continued)

OTHER PUBLICATIONS

M.S. Morse et al., IEEE Engineering in Medicine & Biology Society 11TH Annual International Conference, pp. 1793-1794, XP-010088605, "Use of Myoelectric Signals to Recognize Speech", 1989.*

(Continued)

*Primary Examiner*—David R Hudspeth
*Assistant Examiner*—Justin W Rider
(74) *Attorney, Agent, or Firm*—Crowell & Moring LLP

(57) ABSTRACT

A speaking period required for a voice recognition processing is detected with a simple and robust approach. A speaking period is detected based on an EMG generated when a speaker speaks. A large amplitude is observed in an EMG as muscular activity is caused when a speaker speaks. By observing this, a speaking period can be detected. The EMG can be measured from the speaker's skin via electrodes provided on a mobile-type terminal. Since a mobile-type terminal is usually pressed to the skin for use, affinity between this use form and the present invention is very high.

9 Claims, 17 Drawing Sheets

U.S. PATENT DOCUMENTS

| | | |
|---|---|---|
| 6,231,500 B1 * | 5/2001 | Kehoe .......................... 600/23 |
| 2002/0133356 A1 * | 9/2002 | Romesburg .................. 704/500 |
| 2003/0163306 A1 * | 8/2003 | Manabe et al. .............. 704/220 |
| 2003/0171921 A1 * | 9/2003 | Manabe et al. .............. 704/232 |

FOREIGN PATENT DOCUMENTS

| | | |
|---|---|---|
| DE | 42 12 907 A1 | 10/1993 |
| EP | 1 341 159 A1 | 9/2003 |
| JP | 6-12483 | 1/1994 |
| JP | 2002-135320 A | 5/2002 |

OTHER PUBLICATIONS

Stéphane Dupont, et al, "Combined Use of Close-Talk and Throat Microphones for Improved Speech Recognition Under Non-Stationary Background Noise.", Multitel & FPMS-TCTS, Avenue Copernic 1, B-7000 Mons, Belgium, XP-00231165.

A. D. C. Chan, et al., "Myo-Electric Signals to Augment Speech Regonition", Medical and Biological Engineering & Computing, 2001, pp. 500-504, vol. 39, XP-00178739.

Hae-Jeong Park, et al., "Adaptive EMG-Driven Communication for the Disability", Proceedings of the First Joint BMES/EMBS Conference, Oct. 13-16, 1999, pp. 656, Atlanta, GA.

Masakiyo Fujimoto et al., "Handsfree Voice Recognition Using Microphone Array and Kalman Filter in an Actual Environment—Construction of Front-End System for Interactive TV", The Fourth DSPS Educators Conference, Aug. 2002, pp. 55-58.

Kazumasa Murai et al., "A Robust End Point Detection by Speaker's Facial Image", Graduate School of Information Science, Nara Institute of Science and Technology, Dec. 2000.

"Featured: Mobile Multimedia Signal Processing Technology—Voice Coding Technology", 2001, NTT DoCoMo Technical Journal, vol. 8, No. 4, pp. 25-33.

Boll, Steven F., "Suppression of Acoustic Noise in Speech Using Spectral Subtraction", IEEE Transactions on Acoustics, Speech, and Signal Processing, vol. ASSP-27, No. 2, Apr. 1979, pp. 113-120.

* cited by examiner

*FIG. 8A* *FIG. 8B*
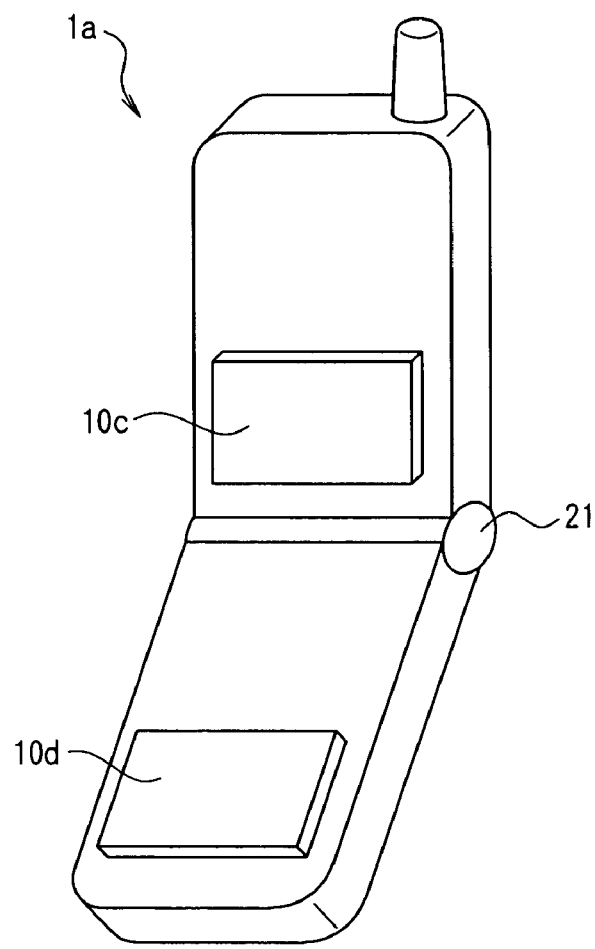
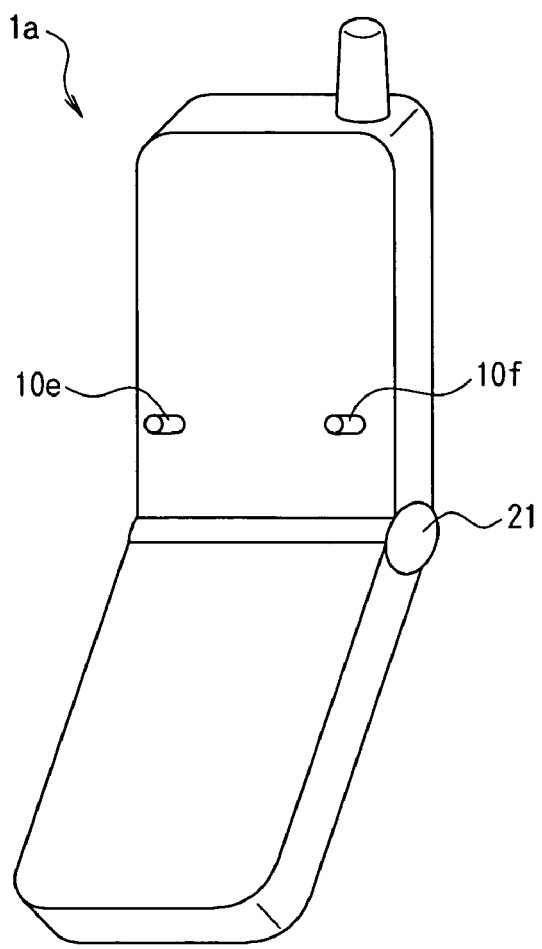

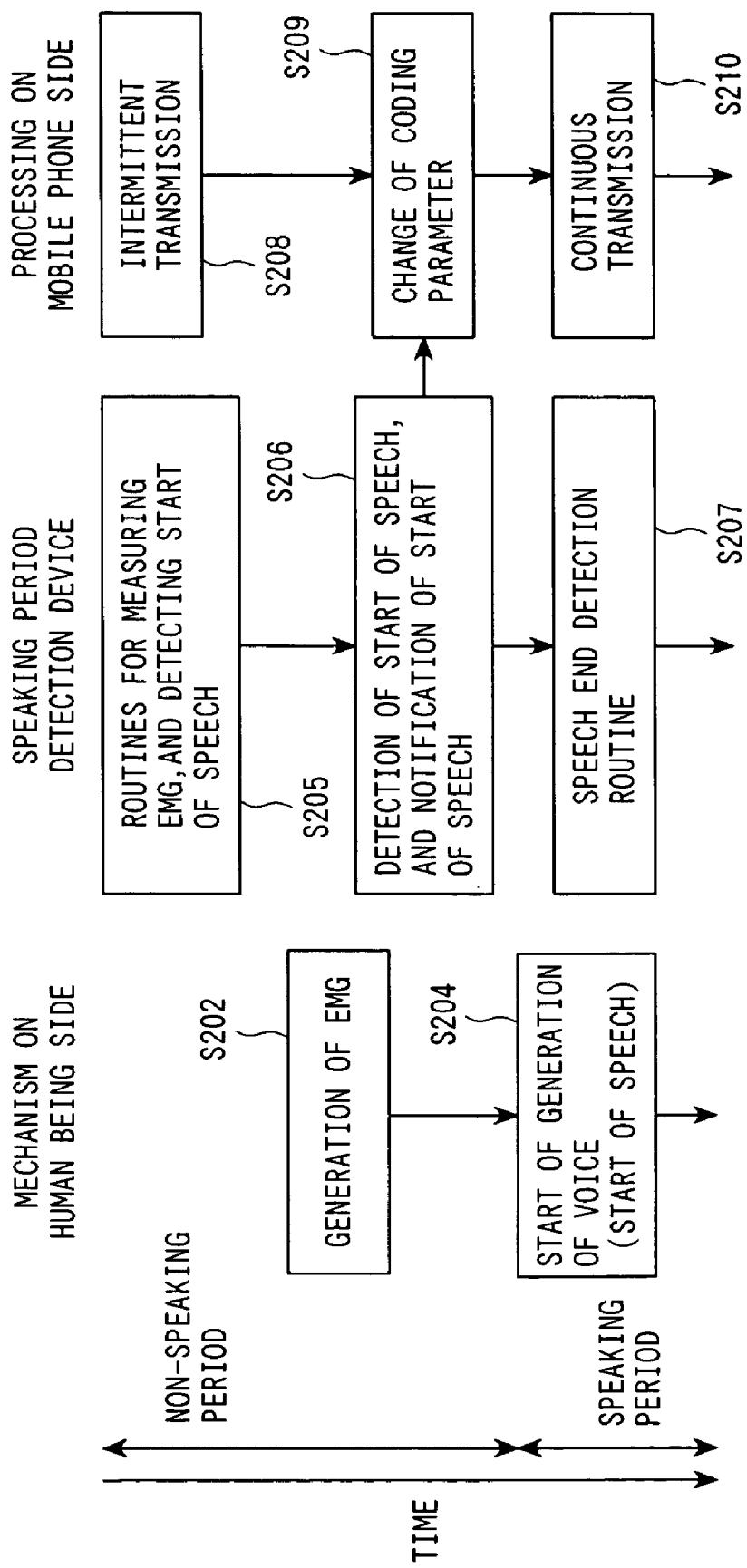

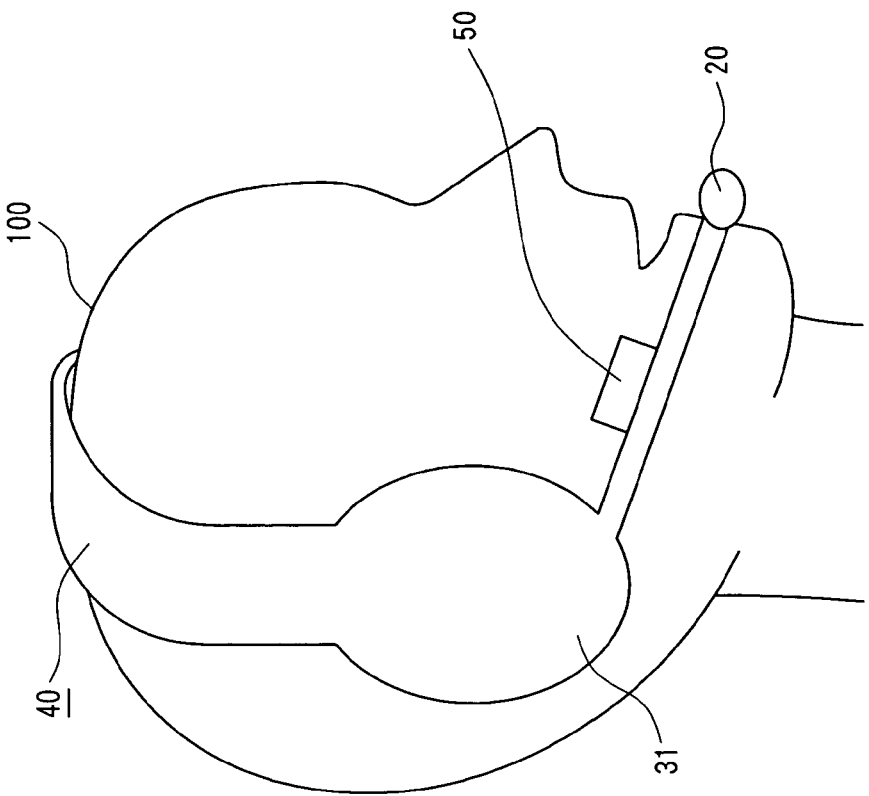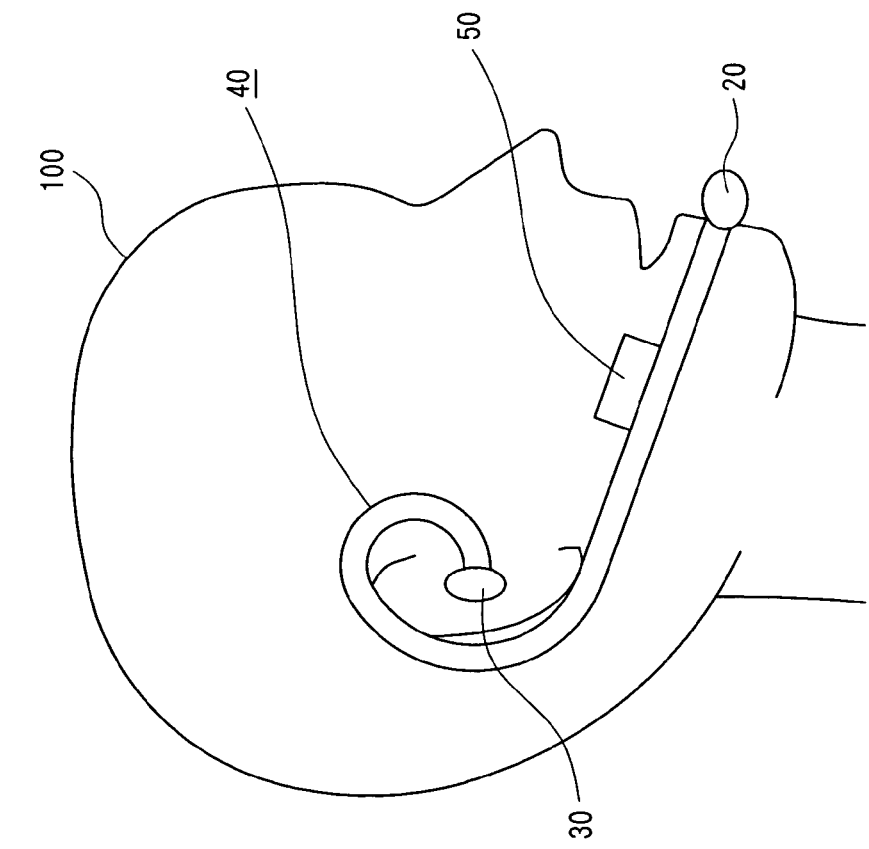

SPEAKING PERIOD DETECTION DEVICE, VOICE RECOGNITION PROCESSING DEVICE, TRANSMISSION SYSTEM, SIGNAL LEVEL CONTROL DEVICE AND SPEAKING PERIOD DETECTION METHOD

BACKGROUND OF THE INVENTION

1. Field of the Invention

The present invention relates to detection of a speaking period in a voice recognition processing performed in a noisy environment or where a lot of people speak at the same time.

2. Description of the Related Art

In usual voice detection devices, there has been adopted a voice recognition technique of handling a voice in speech as an acoustic signal and performing frequency analysis for the acoustic signal to recognize and process voice information. In order to provide a desirable voice detection result using the voice recognition technique, it is important to accurately recognize contents of speech from a detected voice signal as well as to accurately detect whether or not the speaker concerned is actually speaking (detection of a speaking period) Especially in the case of voice recognition performed in a noisy environment or where a lot of people are speaking at the same time, detection a speaking period is an important problem.

The reason is that, while a speaking period can be easily detected by observing power of a detected voice signal in an environment with few noises, it cannot be simply detected from the power because the detected voice signal has noises added thereto in such a noisy environment. If a speaking period cannot be detected, a voice cannot be recognized even if there is provided a voice recognition device robust against noises for subsequent processing.

Several researches have been made on detection of a speaking period. For example, "Handsfree Voice Recognition Using Microphone Array and Kalman Filter in An Actual Environment-Construction of Front-End System for Interactive TV" by Masakiyo Fujimoto and Yasuo Ariki; The Fourth DSPS Educators Conference; pp. 55-58; August, 2002, and "Robust Speech Detection Using Images of Portions Around Mouth" by Kazumasa Murai, Keisuke Noma, Ken-ichi Kumagai, Tomoko Matsui, and Satoshi Nakamura; Information Processing Society of Japan Research Report "Voice Language Information Processing" No. 034-01; March, 2000, are on such researches.

The approaches of the techniques described in these documents and other prior-art techniques are roughly classified into two: one is an approach attempting to detect a speaking period only from a voice signal, and the other is an approach attempting to detect a speaking signal not only from a voice signal but also from a non-voice signal.

SUMMARY OF THE INVENTION

Each of the above two approaches has a problem. In the case of attempting detection only from a voice signal, there is a disadvantage that the detection accuracy considerably depends on the loudness and the kind of ambient noises. In order to realize robust detection of a speaking period that is not influenced by ambient noises at all, detection from a non-voice signal, as performed by the latter approach, is important.

In the case of using a non-voice signal, however, there is a problem that installation of a sensor other than a microphone is required for voice recognition. For example, if an image is used as a non-voice signal, it is necessary to provide a camera in a manner that a lip portion is always within a field of view, and furthermore, it is also necessary that the lip portion is always at a constant position in the field of view of the camera. However, it is practically impossible to provide a camera in a manner that this is achieved. In addition, an image recognition technique is required to detect a speaking period from images of the lip portion.

Generally, image recognition techniques require a huge number of operations. The case of performing voice recognition in a noisy environment is commonly assumed to be the case where voice recognition is performed using a mobile-type terminal, such as a mobile phone. However, such a mobile-type terminal is not provided with adequate computation ability to perform image processing and therefore, it is practically difficult to use the mobile-type terminal for image processing, just as solving the above problem was impractical.

Accordingly, the object of the present invention is to provide a speaking period detection device and a speaking period detection method capable of solving the problem of providing a sensor for detection of a non-voice signal and the problem of huge number of operations by detecting a speaking period from an EMG (electromyography), which is a non-voice signal. Another object of the present invention is to provide a voice recognition processing device, a transmission system, a signal level control device which utilize the speaking period detection device described above.

The speaking period detection device according to the first aspect of the present invention comprises detection means for detecting an EMG generated while a speaker is speaking; and speaking period detection means for detecting a speaking period based on the EMG detected by the EMG detection means; wherein the device derives information relating to the speaking period detected by the speaking period detection means. According to this configuration, it is possible to detect a speaking period based on an EMG. According to this configuration, a speaking period can be detected irrespective of the condition of ambient noises, and therefore, voice recognition is possible even in a noisy environment.

The speaking period detection device according to the second aspect of the present invention is the speaking period detection device according to the first aspect, wherein the EMG detection means detects the EMG from electrodes provided on a portion of the case of a terminal used by the speaker for speaking, the portion being in contact with the speaker's skin while the speaker is speaking. According to this configuration, an EMG can be detected only by the speaker utilizing a terminal he uses and contacting the electrode with the surface of his/her skin.

The speaking period detection device according to the third aspect of the present invention is the speaking period detection device according to first or second aspect, wherein the speaking period detection means compares an amplitude value of the EMG with a predetermined threshold to detect speech start timing and speech end timing of the speaking period. According to this configuration, there appears a large amplitude in an EMG as muscular activity is caused when the speaker speaks, and a speaking period, that is, the speaking start timing and the speaking end timing can be detected by catching the large amplitude.

The speaking period detection device according to the fourth aspect of the present invention is the speaking period detection device according to anyone of first to third aspects, further comprising a counter for counting the result of the comparison of the amplitude value of the EMG and the predetermined threshold, wherein the speaking period detection means determines a speaking period only when the count value of the counter exceeds a predetermined value. According to this configuration, even if a large amplitude is instantaneously included in an EMG for some reason, a speaking period can be correctly determined.

The speaking period detection device according to the fifth aspect of the present invention is the speaking period detection device according to any one of the first to fourth aspects, further comprising storage means for saving a speaking voice signal of the speaker; wherein saving of the speaking voice signal is started at the speech start timing and ended at the speech end timing. According to this configuration, independence between this device and a voice recognition device can be enhanced, and a common voice recognition device can be utilized in combination with this device without making any change in the voice recognition device.

The voice recognition processing device according to the sixth aspect of the present invention is a voice recognition processing device for performing a voice recognition processing for a speaking voice signal, the voice recognition processing device comprising voice recognition processing means for performing a voice recognition processing for a speaking voice signal corresponding to a speaking period detected by the speaking period detection device according to any one of first to fourth aspects. According to this configuration, it is possible to detect a speaking period without being influenced by noises, and therefore accuracy of voice recognition can be improved.

The voice recognition processing device according to the seventh aspect of the present invention is a voice recognition processing device for performing a voice recognition processing for a speaking voice signal, the voice recognition processing device comprising voice recognition processing means for performing a voice recognition processing for a speaking voice signal stored in the storage means by the speaking period detection device according to fifth aspect. According this configuration, it is possible to detect a speaking period without being influenced by noises, and therefore accuracy of voice recognition can be improved.

The transmission system according to eighth aspect of the present invention is a transmission system for performing a coding processing for a speaking voice signal corresponding to a speaking period and transmitting the coded voice signal, the transmission system comprising coding processing timing determination means for determining timing of the coding processing based on a speaking period detected by the speaking period detection device according to any one of first to fifth aspects. According to this configuration, unnecessary communication can be prevented by detecting a speaking period, and thereby power consumption can be reduced.

The signal level control device according to the ninth aspect is a signal level control device for controlling a level of an output signal derived from a microphone, the signal level control device comprising control means for controlling the level of an output signal based on a speaking period detected by the speaking period detection device according to any one of first to fifth aspects, and controlling a voice corresponding to a non-speaking period not to be outputted. According to this configuration, by controlling the level of an output signal derived from a microphone based on a detected speaking period, only voices corresponding to speaking periods can be outputted. Voices corresponding to non-speaking periods are controlled not to be outputted, for example, by turning on/off the power source switch of a microphone, changing gain of a microphone, and changing output from a speaker.

The speaking period detection method according to the tenth aspect of the present invention comprises: an EMG detection step of detecting an EMG generated while a speaker is speaking (corresponding to step S41 in FIG. 4); and a speaking period detection step of detecting a speaking period based on the EMG detected at the EMG detection step (corresponding to steps S42 to S44 in FIG. 4); wherein information relating to the speaking period detected at the speaking period detection step is notified. According to this configuration, a speaking period can be detected based on an EMG. Accordingly, a speaking period can be detected irrespective of the condition of ambient noises, and therefore, voice recognition is possible even in a noisy environment.

According to the present invention, it is possible to detect a speaking period without being influenced by ambient noises and with a very simple method of pressing electrodes provided for a mobile-type terminal and the like to the skin. Thereby, improvement of recognition accuracy in voice recognition in a noisy environment can be expected. Furthermore, unnecessary communication can be prevented by detecting a speaking period, and thereby power consumption can be reduced. Furthermore, by controlling the level of a signal derived from a microphone based on a detected speaking period, only voices corresponding to speaking periods can be outputted.

BRIEF DESCRIPTION OF THE DRAWINGS

FIGS. 8A and 8B are schematic diagrams showing an example of arrangement of surface electrodes for EMG detection;

FIG. 17 shows timing of detection of a speaking period for an EMG and timing of processing performed on the mobile phone side;

FIG. 22A shows a head set including a supra-aural earphone/speaker;

FIG. 22B shows a head set including a head-phone type speaker;

DETAILED DESCRIPTION OF THE PREFERRED EMBODIMENTS

Figure 1:
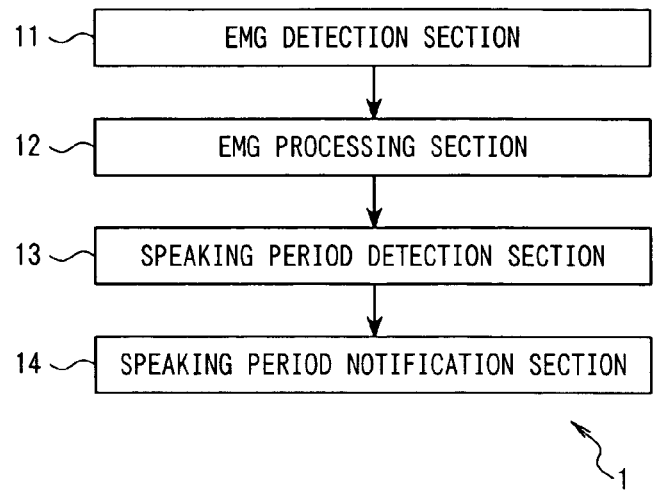
FIG. 1 shows the configuration of a speaking period detection device according to the present invention.

An embodiment of the present invention will be now described with reference to drawings. In each of figures referred to in the description below, the same reference numerals are given to the same portions as those in the other figures.

(Entire Configuration)

FIG. 1 is a block diagram showing the configuration of main portions of a speaking period detection device according to the present invention. The speaking period detection device 1 according to the present invention comprises an EMG detection section 11, an EMG processing section 12, a speaking period detection section 13 and a speaking period notification section 14.

In this figure, the EMG detection section 11 detects an EMG when a speaker speaks. The EMG detection section 11 is configured to include surface electrodes which will be described later. That is, an EMG is detected via the surface electrodes which are in contact with the surface immediately above the muscle which is active during speech. More specific arrangement of the electrodes will be described later.

At the EMG processing section 12, the EMG detected by the EMG detection section 11 is amplified. The EMG processing section 12 also processes the EMG with a low-pass filter, a high-pass filter and the like for the purpose of removing noises or deriving a desired signal efficiently. Furthermore, it calculates parameters required by the speaking period detection section 13.

At the speaking period detection section 13, the start point and the end point of a speaking period is detected based on the parameters calculated by the EMG processing section 12.

The speaking period notification section 14 notifies the start point and the end point of the speaking period which have been detected by the speaking period detection section 13 to a subsequent voice recognition algorithm so that the algorithm performs voice recognition. The voice recognition algorithm which performs a voice recognition processing using the start point and the end point of the speaking period notified by the speaking period notification section 14 is not limited to a particular algorithm, and any algorithm can be used.

According to the above configuration, it is possible to detect a speaking period based on an EMG. Thus, a speaking period can be detected irrespective of the condition of ambient noises, and thereby voice recognition in a noisy environment can be possible.

(Basic Principle)

Figure 2:
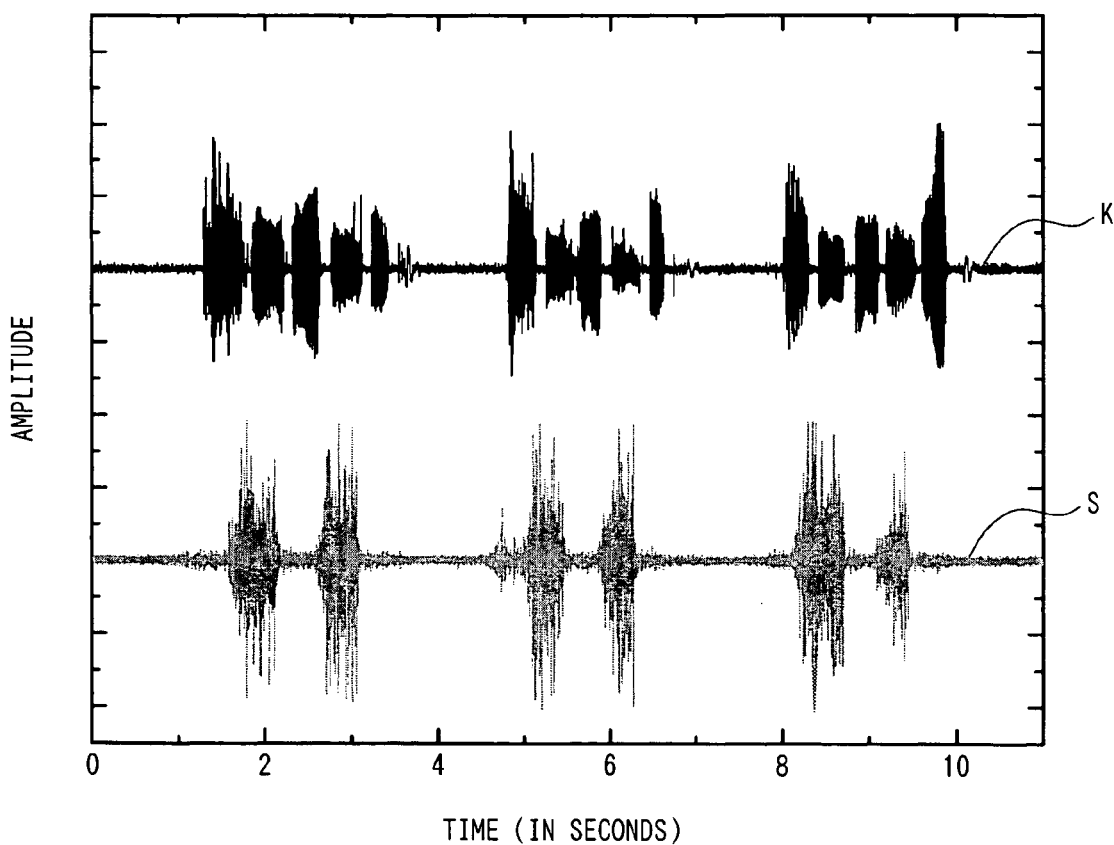
FIG. 2 shows relationship between an EMG and a voice signal.

FIG. 2 shows relationship between an EMG and a voice signal, which is a basic principal of the present invention. In this figure, the horizontal axis indicates time (in seconds) and the vertical axis indicates the amplitude.

This figure shows a surface EMG measured from a cheek portion of a speaker when he repeatedly utters "a-i-u-e-o", Japanese vowels, and a voice signal measured at the same time. An EMG K and a voice signal S are shown at the upper part and the lower part of the figure, respectively.

It should be noted that the voice signal S and the EMG K are synchronized. More specifically, the speaker utters "a-i-u-e-o" for the period of approximately 1.5 to 3.2 seconds, and a voice signal with a large amplitude corresponding thereto is observed. A large amplitude is also observed for the period in the EMG.

The same goes for "a-i-u-e-o" uttered for the period of approximately 4.7 to 6.3 seconds and furthermore for "a-i-u-e-o" uttered for the period of approximately 8 to 9.5 seconds. In the other periods, the speaker does not utter a voice and ambient noises are mixed.

The present invention was triggered by the discovery by the inventor that a voice signal and an EMG are synchronized as shown in FIG. 2. It was also found that a voice signal and an EMG are synchronized as shown in FIG. 2 not only when the contents uttered is "a-i-u-e-o" but also other contents. In short, a large amplitude, which accompanies muscular activity caused when a speaker speaks, is observed in an EMG, so that a speaking period can be detected by observing this.

The voice signal and the EMG shown in FIG. 2 were measured where ambient noises are not so loud (in a common office). If a similar experiment is conducted where the level of ambient noises is high, the ambient noises are superposed on a voice signal. On the contrary, an EMG is advantageously not influenced at all.

(Speaking Period Detection Processing)

A processing for detecting a speaking period will be specifically described below.

Figure 3:
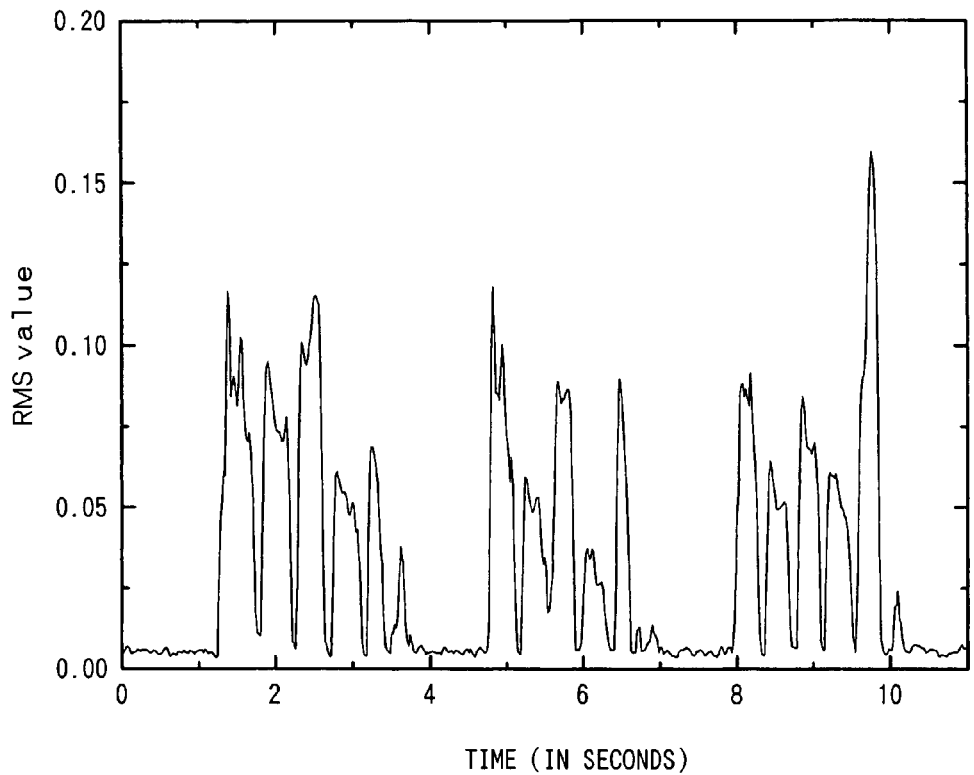
FIG. 3 shows RMS of an EMG shown in time series.

FIG. 3 shows an example of a processing for detecting a speaking period for an EMG. FIG. 3 shows a root mean square (hereinafter abbreviated to RMS) which has been calculated from the EMG shown in FIG. 2 and displayed in time series. In this figure, the horizontal axis indicates time (in seconds) and the vertical axis indicates an RMS value. The RMS value was calculated with the frame period of 20 ms and the frame length of 50 ms.

As seen from FIG. 3, the value is obviously larger when a voice is uttered than when a voice is not uttered. In this figure, the RMS value of the EMG when a voice is not uttered is approximately 0.01. Therefore, by setting a threshold such as 0.02 and 0.03 and comparing it with the RMS value, a speaking period can be detected. That is, while the RMS value exceeds the set threshold, the period can be detected as a speaking period. While it is below the set threshold, the period can be detected as a non-speaking period.

(Processing for Determining a Speaking Period)

Figure 4:
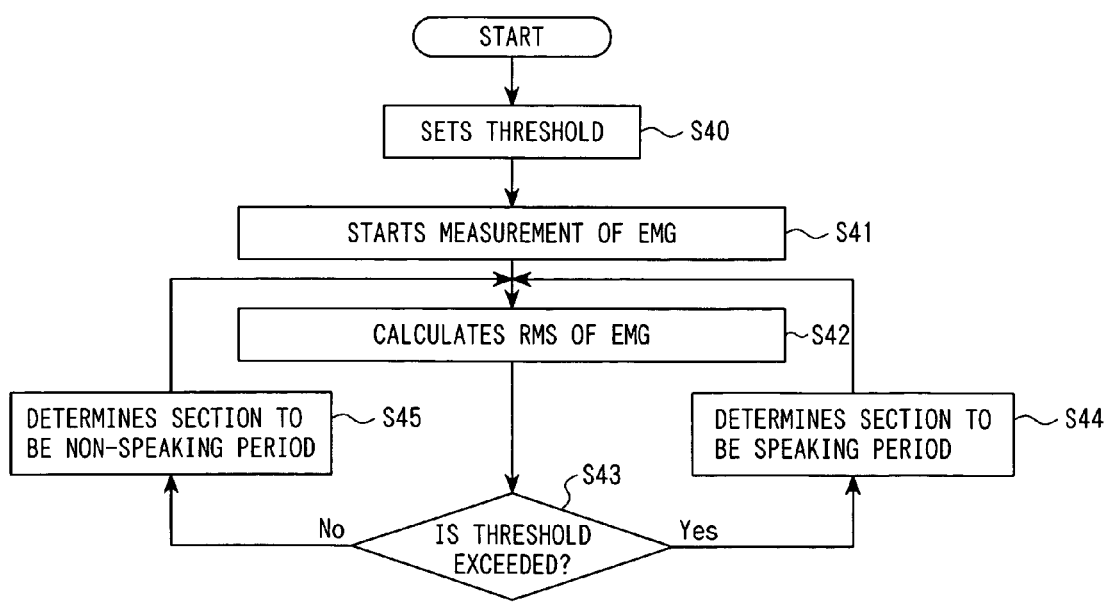
FIG. 4 is a flowchart showing an example of a processing of determining a speaking period for an EMG.

FIG. 4 is a flowchart showing a processing of determining a speaking period for an EMG.

In this figure, the threshold described above is set in advance (step S40). Measurement of an EMG is then started (step S41). Then, RMS values are sequentially calculated from the measured EMG (step S42). In this case, the frame period and the frame length may be 20 ms and 60 ms, respectively. Other values may be used.

It is then determined whether the values exceed the threshold set in advance (step S43). If the threshold is exceeded, then the period is determined to be a speaking period (step S44). On the contrary, if the threshold is not exceeded, then the period is determined to be a non-speaking period (step S45). The above processing is repeatedly performed.

Though the figure is a flowchart showing the processing to be performed when RMS values are calculated from an EMG, the present invention does not necessarily require use of RMS. That is, various feature amounts extracted from a measured EMG may be used. For example, an average relative variation (ARV), an integrated EMG (iEMG) signal, the frequency spectrum of an EMG and the like may be used.

Furthermore, the number of crossings with a threshold may be used instead of the RMS in FIG. 4. That is, the number of positions of a measured EMG which exceed a threshold (10 (mV), for example) set in advance is counted, and the counted number may be used. For example, if the sampling values of a measured EMG are 1, 5, 12, 8 and −2 (mV) and the threshold is 10 (mV), then the value of counted crossings is "1". If the threshold is 6 (mV), then the value of counted crossings is "2". Thus, the same processing as described above can be also performed by using the number of crossings with the threshold set in advance instead of an RMS.

The sampling frequency of the EMG is 2000 Hz, for example.

As described above, by comparing the value of the amplitude of an EMG with a predetermined threshold, speaking start timing and speaking end timing of a speaking period can be detected. In short, there appears a large amplitude in an EMG as muscular activity is caused when a speaker speaks, so that a speaking period, that is, speaking start timing and speaking end timing can be detected by catching the large amplitude.

(Variation of the Determination Processing)

Figure 5:
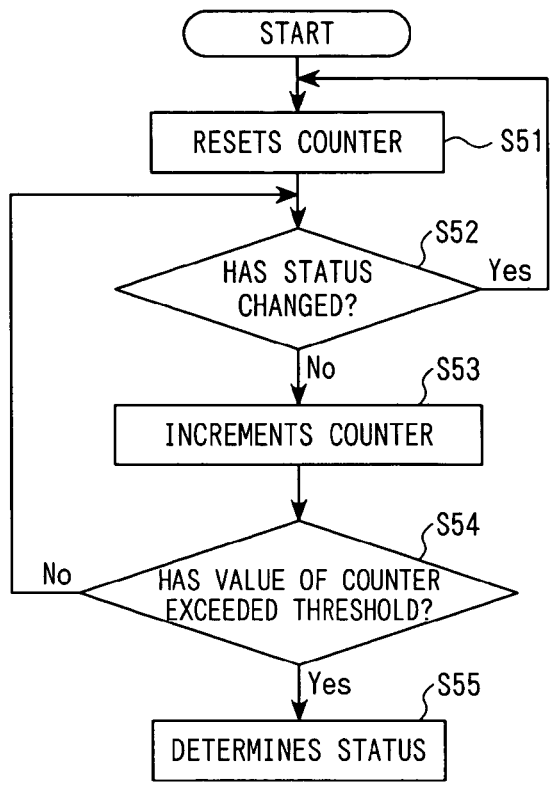
FIG. 5 is a flowchart showing a variation example of the processing of determining a speaking period for an EMG.

The flowchart shown in FIG. 5 can be added to the flowchart shown in FIG. 4. The flowchart shown in FIG. 4 has a problem that, if a large amplitude is instantaneously included in an EMG for some reason, the period is determined to be a speaking period even if it is a non-speaking period. In order to reduce influence by such short-time fluctuation, the flowchart shown in FIG. 5 can be added and replaced with steps S43 to S45 of the flowchart in FIG. 4.

Figure 6:
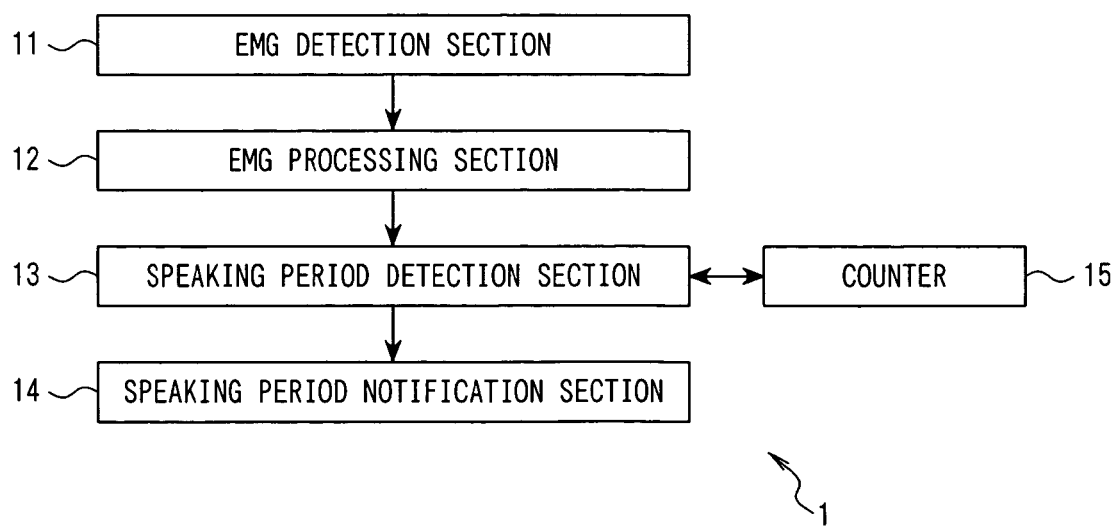
FIG. 6 is a block diagram showing a configuration example in which a counter is added to the configuration of FIG. 1.

In FIG. 5, the "status" means either of the two kinds of periods, that is, a speaking period and a non-speaking period. For example, in order for a period to be determined as a non-speaking period (or a speaking period), it is necessary that multiple periods have been determined to be non-speaking periods (or speaking periods) immediately before the period. To achieve this, a counter 15 is added to the configuration of FIG. 1 to count the number of repeated consecutive non-speaking periods (or speaking periods) as shown in FIG. 6. The value of the counter is compared with a preset threshold. When the value exceeds the threshold, the period is determined to be a non-speaking period (or a speaking period) for the first time. The cycle for determining the number of multiple periods may be 20 Hz, for example.

After an RMS value of an EMG is calculated at step S42 of FIG. 4, the process proceeds to steps in FIG. 5. First, the count value of the counter is reset (step S51). If the status described above has not changed, the count value of the counter is incremented (from step S52 to step S53). If the count value of the counter does not exceed the preset threshold as a result of the increment, then the count value is incremented again (from step S54 to step S52).

On the contrary, if the count value of the counter exceeds the preset threshold as a result of the increment, then the status is determined, and thereby a speaking period or a non-speaking period is determined (from step S54 to step S55) If the status has changed at step S52, the count value of the counter is reset (from step S52 to step S51) and the process continues.

If the above-described flowchart shown in FIG. 5 is added, there is caused a problem that a determined speech start point (or speech end point) is behind the actual speech start point (or speech end point) in time. However, by correcting the speaking period, which has been determined in accordance with the flowcharts of FIG. 4 and FIG. 5, with the time corresponding to the threshold compared with the above-described count value of the counter, the actual speech start point and speech end point can be detected.

For example, if increment of the count value is started when the time is "0" (the period before this is a non-speaking period), a speaking period is not determined at this point. The time is incremented to be "1", "2", "3" and so on, and when the count value reaches "n", which is the threshold, a speaking period is determined for the first time. Therefore, though it is at the time corresponding to the count value "n" that a speaking period is determined, the speech was actually started at the time of "0". Accordingly, a correct speech start point and a correct speech end point can be detected by performing correction with time corresponding to the period from the count values "0" to "n".

Furthermore, by adopting the flowchart shown in FIG. 5, there is obtained an advantage of coping with a problem that the level of an EMG may become very low through a sequence of speaking periods as shown in FIG. 2.

That is, a phenomenon is confirmed in FIG. 2 that the amplitude of the EMG falls off in the vicinity of the 2-second point and the 2.5-second point. In the case of the flow of FIG. 4, these portions are regarded as non-speaking periods. However, by adding the flowchart of FIG. 5, these portions are not determined as non-speaking periods but can be regarded as speaking periods.

(Speaking Period Detection Method)

In the speaking period detection device described above, a speaking period detection method as described below is adopted. That is, there is adopted a speaking period detection method which comprises: an EMG detection step of detecting an EMG generated while a speaker is speaking (corresponding to step S41 in FIG. 4); and a speaking period detection step of detecting a speaking period based on the EMG detected at the EMG detection step (corresponding to steps S42 to S44 in FIG. 4); wherein information on the speaking period detected at the speaking period detection step is notified. According to this configuration, a speaking period can be detected based on an EMG. Accordingly, a speaking period can be detected irrespective of the condition of ambient noises, and therefore, voice recognition in a noisy environment can be possible.

Description will be now made on an example wherein a speaking period detection device according to the present invention is applied to a mobile-type terminal.

(Example of Use)

Figure 7:
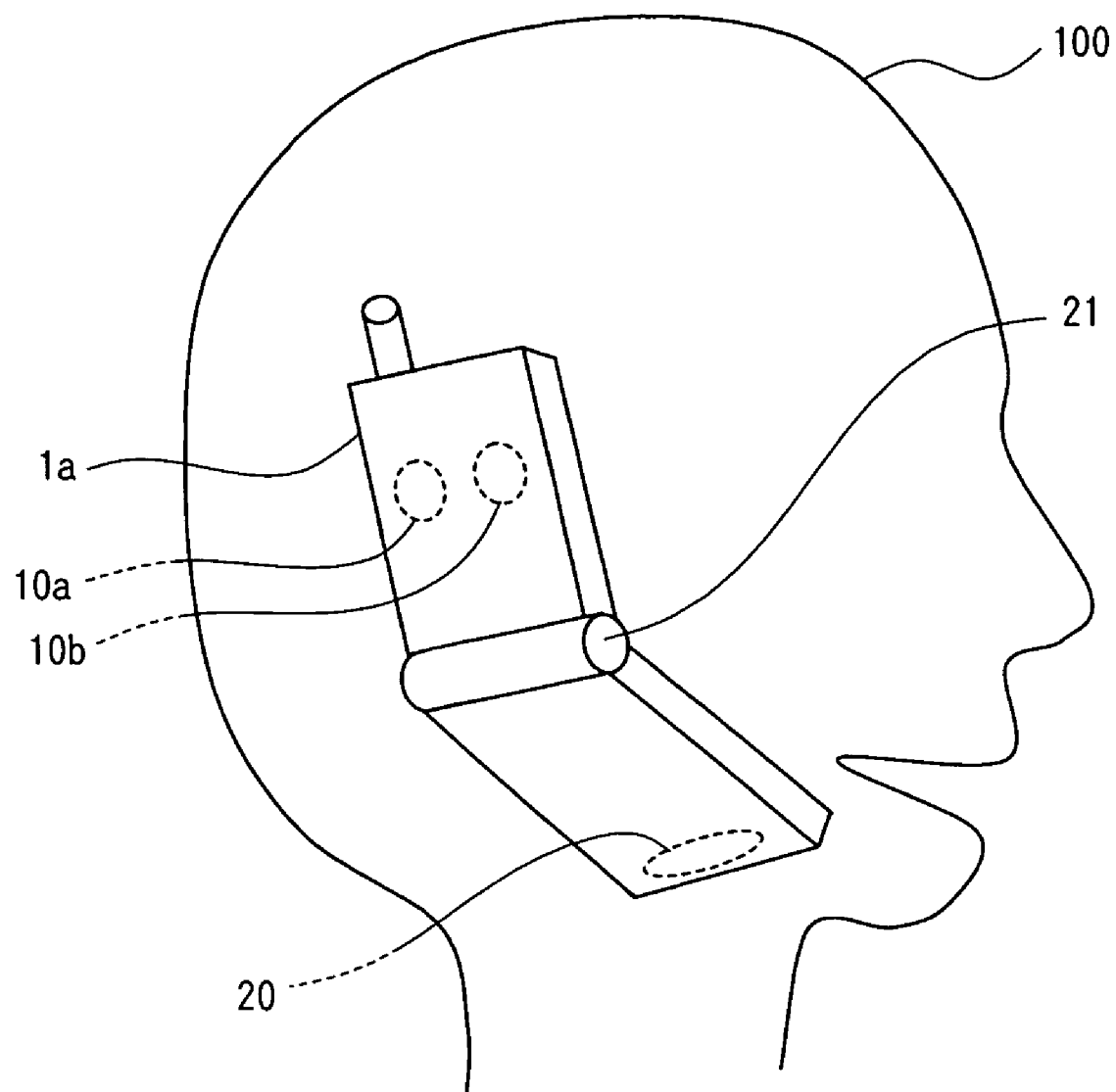
FIG. 7 is a schematic diagram showing an example of use of a mobile-type terminal in which the speaking period detection device according to the present invention is employed.

FIG. 7 shows an example of use of a mobile-type terminal in which a speaking period detection device according to the present invention is employed. In the figure, it is assumed that communication is performed by utilizing a mobile-type terminal such as a mobile telephone.

As shown by the dashed line in the figure, a mobile-type terminal 1a is provided with surface electrodes for EMG detection 10a and 10b and a microphone 20. The surface electrodes for EMG detection 10a and 10b are provided on the side which is in contact with the skin of the face of a user 100 who is a speaker. Accordingly, during use of the mobile-type terminal 1a, an EMG can be detected from the skin with which each of the pair of the surface electrodes for EMG detection 10a and 10b is in contact.

The mobile-type terminal 1a shown in the figure is a so-called flip-type terminal which is provided with a hinge 21. The present invention is, of course, applicable to a terminal which is not provided with the hinge 21.

It is assumed to be an unchangeable fact that, when communication is performed by utilizing a mobile-type terminal such as a mobile phone, the microphone of the terminal is positioned in the vicinity of the mouth of a user and the speaker is in the vicinity of his/her ears.

It is assumed that the current mobile phone terminal will not change much in its form in the future though it may be miniaturized. Thus, an important point is that a mobile-type terminal, especially a terminal for conversation such as a mobile phone terminal is used in contact with the skin. This means that a surface electrode can be in contact with the skin without giving uncomfortable feelings to the user.

When a speaking period is detected using a camera as have been done in prior-art techniques, a camera or a sensor must be set at a desired position only for the purpose. In the case of using an EMG, however, it is possible to detect a speaking period without changing the usual form, that is, the form of utilizing a mobile-type terminal in contact with the skin and without performing a further operation or setting a sensor.

In short, since a mobile-type terminal is usually pressed to the skin for use, affinity between this use form and the present invention is very high.

(Arrangement of Electrodes)

FIGS. 8A and 8B show an example of arrangement of electrodes. In the figure, there is shown an example wherein a mobile-type terminal is provided with electrodes for EMG detection. In the example shown in FIG. 8A, the mobile-type terminal 1a is provided with relatively large surface electrodes 10c and 10d. Each of the surface electrodes 10c and 10d is a plane electrode with a size of 2 cm×3 cm, for example. The surface electrode 10c is to be in contact with the cheek portion of a user, for example, and the surface electrode 10d is to be in contact with the mouth portion of the user, for example, and thereby an EMG can be detected from the pair of electrodes.

In the example shown in FIG. 8B, the mobile-type terminal 1a is provided with needle-shaped surface electrodes 10e and 10f. Each of the needle-shape surface electrodes 10e and 10f is a needle-type electrode with a diameter of 1 mm, for example. The needle-shaped surface electrodes 10e and 10f are to be in contact with the cheek portion of a user, and thereby an EMG can be detected from the pair of electrodes.

The surface electrodes described above are only examples, and a pair of electrodes for detecting an EMG of any form may be provided on the case of the mobile-type terminal 1a. The surface electrodes, however, are required to be provided on a portion of the case of the mobile-type terminal 1a which is to be in contact with a speaker's skin while he is speaking. The configuration of a circuit for measuring an EMG obtained via the surface electrodes described above is well known, and therefore description thereof is omitted.

(Example of Operation)

Figure 9:
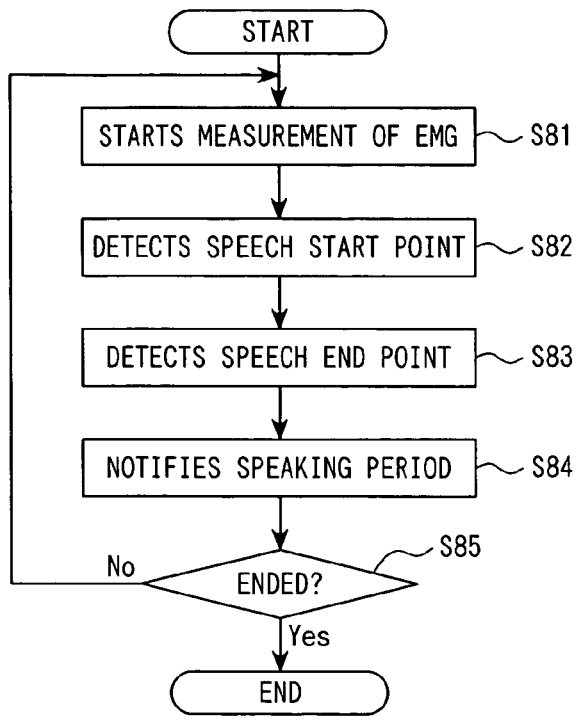
FIG. 9 is a flowchart showing an example of operation of a mobile-type terminal in which the speaking period detection device according to the present invention is employed.

FIG. 9 is a flowchart showing an example of operation of a mobile-type terminal in which a speaking period detection device according to the present invention is employed.

In this figure, a user contacts the mobile-type terminal with his/her skin first. After the contact, an EMG is detected via surface electrodes for EMG detection which are in contact with the skin (step S81).

When the user starts speech, muscles around his/her mouth begin to act, and therefore a large amplitude is observed in the detected EMG in comparison with the time of non-speaking (the condition in which there is no speech performed, that is, a silence section in usual voice recognition). By detecting this large amplitude, a speech start point is detected (step S82).

When the speech ends, the amplitude of the detected EMG becomes small. By detecting the point at which the amplitude becomes small, a speech end point is detected (step S83).

The detected speech start point and speech end point are then notified outward (step S84). A subsequent voice recognition algorithm or a voice recognition device is notified thereof and urged to start voice recognition.

The above operation is repeatedly performed (step S85)

Figure 10:
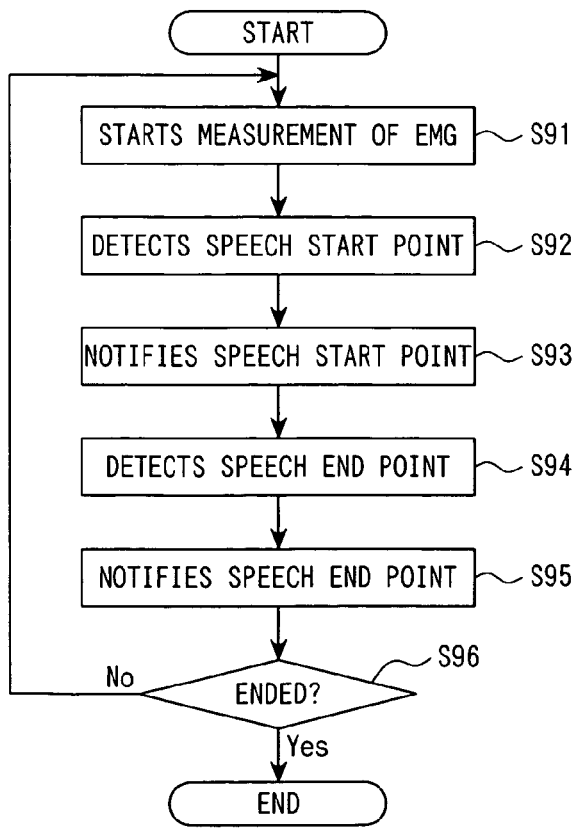
FIG. 10 is a flow chart showing another example of operation of a mobile-type terminal in which the speaking period detection device according to the present invention is employed.

FIG. 10 is a flow chart showing another example of operation of a mobile-type terminal in which a speaking period detection device according to the present invention is employed. The difference of the operation in FIG. 10 from the operation in FIG. 9 is that, when a speech start point is detected, it is immediately notified to a recognition algorithm or a voice recognition device.

In this figure, a user contacts the mobile-type terminal with his/her skin first. After the contact, an EMG is detected via surface electrodes for EMG detection which are in contact with the skin (step S91).

When the user starts speech, muscles around his/her mouth begin to act, and therefore a large amplitude is observed in the detected EMG in comparison with the time of non-speaking. By detecting this large amplitude, a speech start point is detected (step S92). In response to the detection of the speech start point, information to that effect is notified outward (step S93).

When the speech ends, the amplitude of the detected EMG becomes small. By detecting the point at which the amplitude becomes small, a speech end point is detected (step S94). In response to the detection of the speech end point, information to that effect is notified outward (step S95). The above operation is repeatedly performed (step S96).

As described above, by notifying outward the detected speech start point and speech end point, a subsequent voice recognition algorithm or a voice recognition device is notified thereof and urged to start voice recognition.

In the operation in accordance with the flowchart shown in FIG. 10, the voice recognition processing by the voice recognition algorithm or the voice recognition device and the speaking period detection processing can be performed separately. In other words, while the voice algorithm or the voice recognition device is required to be closely related to the speaking period detection processing in the case of the flowchart shown in FIG. 9, they can separately operate in the case of the flowchart shown in FIG. 10.

Figure 11:
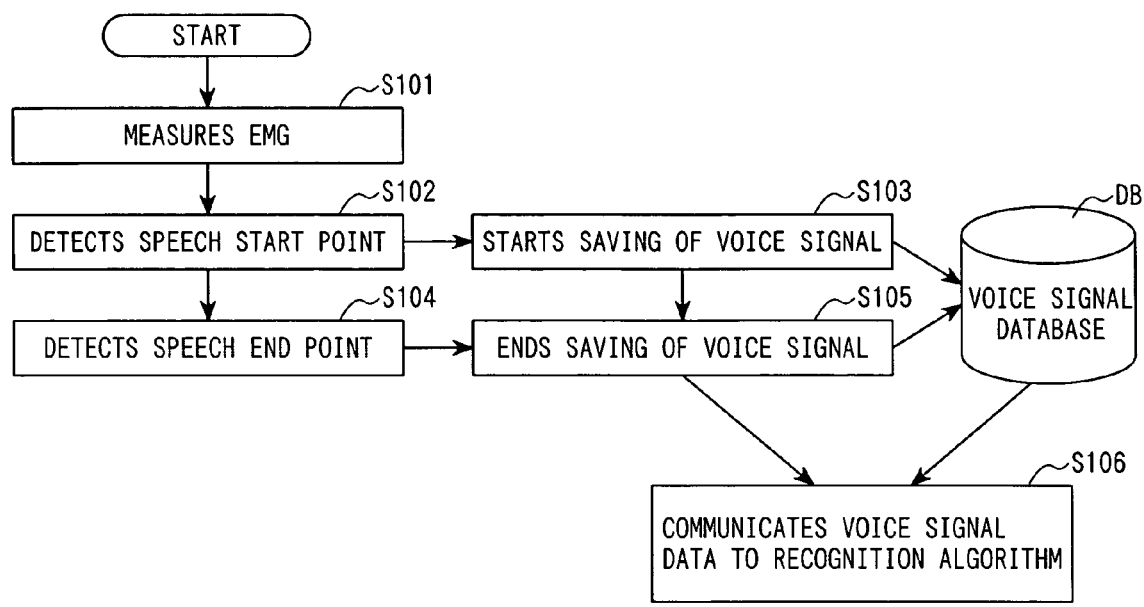
FIG. 11 is a flowchart showing still another example of operation of a mobile-type terminal in which the speaking period detection device according to the present invention is employed.

Furthermore, FIG. 11 is a flowchart showing another example of operation of a mobile-type terminal in which a speaking period detection device according to the present invention is employed. In the flowchart shown in FIG. 11, independence from a voice recognition algorithm or a voice recognition device is higher in comparison with the flowcharts shown in FIGS. 9 and 10.

A user contacts the mobile-type terminal with his/her skin first. After the contact, an EMG is detected via surface electrodes for EMG detection (step S101).

When the user starts speech, muscles around his/her mouth begin to act, and therefore, a large amplitude is observed in the detected EMG in comparison with the time of non-speaking. By detecting this large amplitude, a speech start point is detected (step S102). In response to the detection of the speech start point, it is started to save the voice signal into a voice signal database DB (step S103).

When the speech ends, the amplitude of the detected EMG becomes small. By detecting the point at which the amplitude becomes small, a speech end point is detected (step S104). In response to the detection of the speech end point, saving into the voice signal database DB ends (step S105). After the saving ends, the voice signal data saved in the voice signal database DB is notified outward, such as to an audio recognition algorithm (step S106).

As described above, in the flowchart shown in FIG. 11, a speech start point and a speech end point are detected with the use of an EMG, and voice signal data for a speaking period corresponding thereto is saved in the voice signal database DB. The saved voice signal data is then communicated to a recognition algorithm or a voice recognition device.

According to the operation described above, it is possible to utilize a mobile-type terminal in which a speaking period detection device according to the present invention is employed in combination with a common voice recognition algorithm or a voice recognition device without especially changing the voice recognition algorithm or the voice recognition device. The combination with a voice recognition device will be described later.

(Summary of Speaking Period Detection Device)

Figure 12:
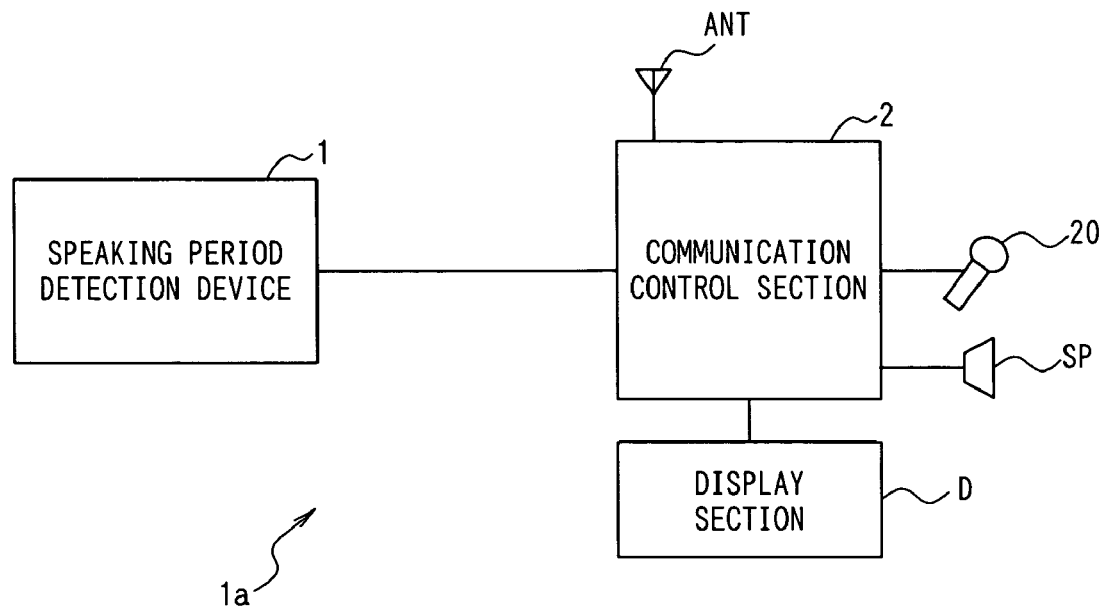
FIG. 12 is a block diagram showing a configuration example in which the speaking period detection device according to the present invention is applied to a mobile-telephone terminal.

If a speaking period detection device according to the present invention is applied to a mobile phone terminal, the configuration will be such as shown in FIG. 12. That is, a mobile-type terminal 1a comprises a speaking period detection device 1 and a communication control section 2. The communication control section 2 performs a voice recognition processing based on data on a speaking period notified from the speaking period detection device 1. The communication control section 2 maybe such as realizes the second-generation mobile phone communication, the third-generation mobile phone communication or a higher-generation mobile phone communication and may be of any configuration.

To the communication control section 2, there are connected a microphone 20, a speaker SP, a display section D and an antenna ANT.

Figure 13:
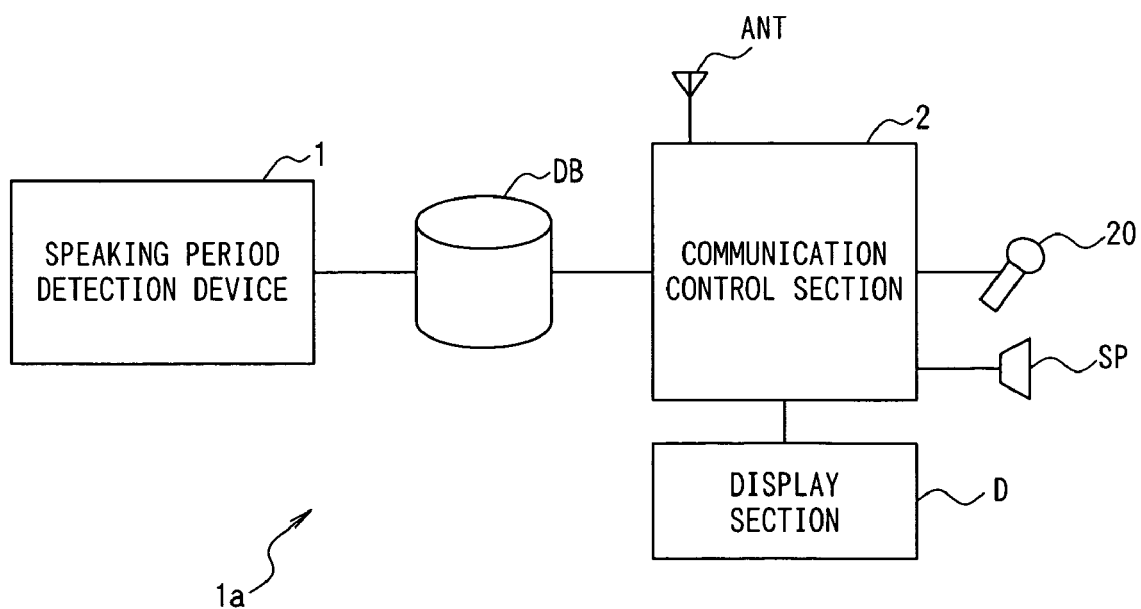
FIG. 13 is a block diagram showing another configuration example in which the speaking period detection device according to the present invention is applied to a mobile-telephone terminal.

In the case where the configuration of FIG. 11 described above is employed, in which independence between the speaking period detection device 1 and the communication control section 2 is enhanced, the voice signal database DB described above is to be provided between the speaking period detection device 1 and the communication control section 2 as shown in FIG. 13. By saving voice signal data in the voice signal database DB, the voice signal data is to be passed from the speaking period detection device 1 to the communication control section 2.

(Application to Transmission System)

The speaking period detection device described above can be applicable to a transmission system for performing a coding processing for a speaking voice signal corresponding to a speaking period and transmitting the coded voice signal. Description thereof will be now made below.

A mobile-type communication terminal such as a mobile phone cannot be mounted with a large capacity battery. Therefore, in order to lengthen continuous use time of a mobile-type communication terminal, it is necessary to improve battery life. Accordingly, in a mobile phone, presence/absence of voice is determined with the use of voice activity detection (VAD). For a non-speaking period, intermittent transmission is performed in which extremely small amount of information is transmitted or transmission is stopped. The intermittent transmission is effective for improvement of battery life and reduction of interference for a mobile phone. This is described by Naka, Ohya, Saegusa, and Hama in "Featured: Mobile Multimedia Signal Processing Technology—Voice Coding Technology" (NTT DoCoMo Technical Journal, Vol. 8, No. 4, pp. 25-33, 2001).

The advantages of VAD are not limited thereto. In the code division multiple access (CDMA) method, a method used for third generation mobile phone services commercialized currently, an advantage of effective utilization of communication channels is also provided. That is, by reducing information transmitted during a non-speaking period, the communication channel can be allocated to a different user, and thereby the communication channel can be effectively utilized.

The VAD is a method in which power, pitch or tone of a detected voice signal is extracted to detect a speaking period. The VAD applied to a mobile phone is specifically specified in 3GPP TS26.094. A voice signal is coded for each frame of 20 ms, 40 ms and the like and transmitted.

In the VAD, however, a speaking period is detected with the use of a voice signal, and therefore, it is determined after the actual speech is made that a speech has started. That is, the time at which start of a speech is determined by the VAD is behind the actual speech start time in principle. The same frame used for coding is used as a frame for which the VAD is performed. Determination by the VAD is performed after the time corresponding to the frame length has elapsed and then a processing for the determination has been performed. Therefore, there is a problem that the time at which coding is performed is behind the determination by the VAD and thereby delay is caused.

For example, if speech start time corresponds to the starting of a frame, at least 20 ms (corresponding to time corresponding to a frame length used) is required until time at which it is determined to be a speech start time. Furthermore, in addition to this, delay corresponding to time required for a determination processing by VAD is caused. In real-time communication such as a voice call with the use of a mobile phone, shorter delay is better. Therefore, with regard to the delay by the VAD, the shorter, the better.

Figure 14:
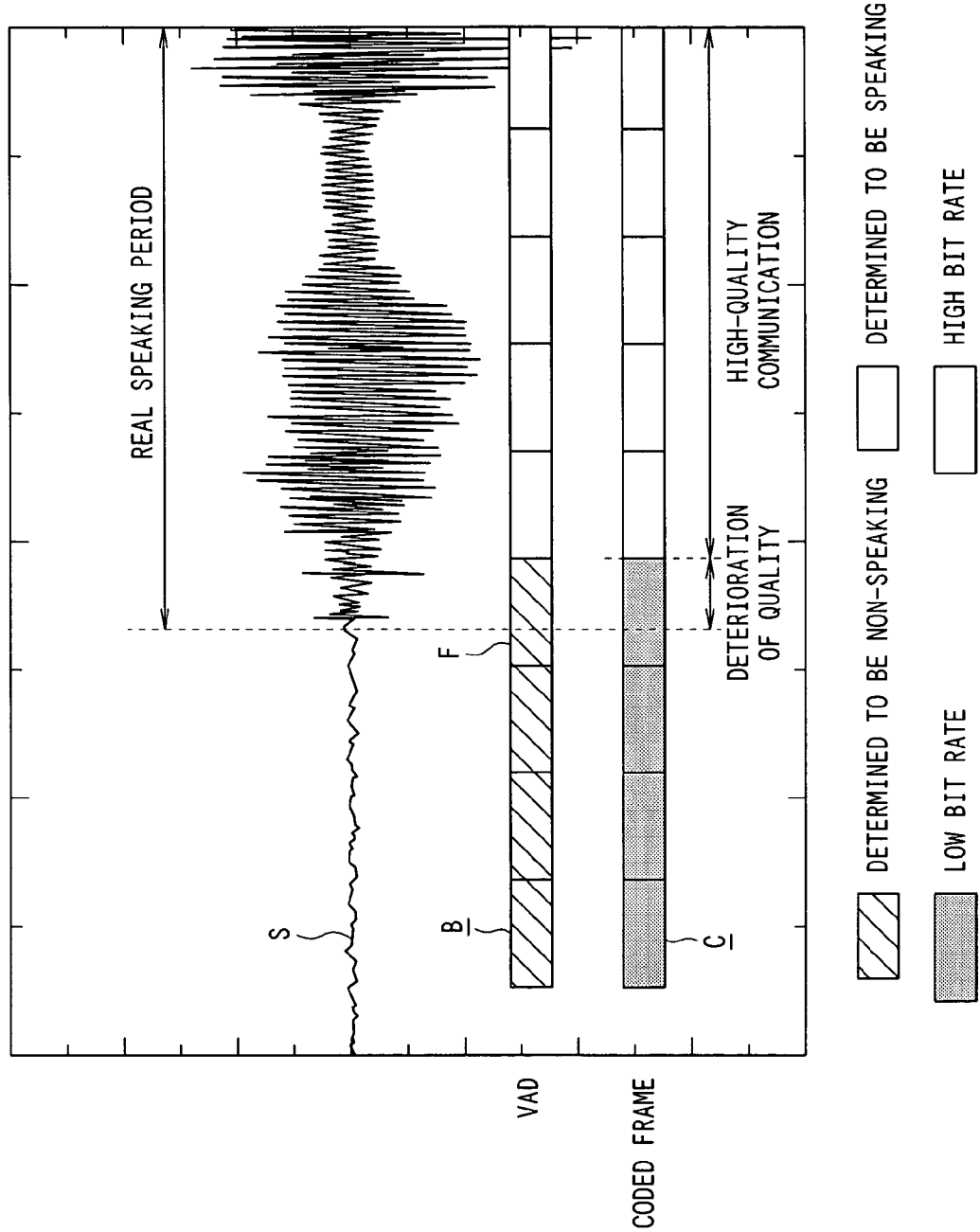
FIG. 14 shows relationship between a voice signal, a frame sequence for which VAD is performed and a coded frame sequence.

Furthermore, if the speech start time is located in the middle or the later half of a frame, a non-speaking period and a speaking period are mixed in the frame including the actual speech start time. For example, FIG. 14 shows a voice signal S, a frame sequence B for which VAD is to be performed and a coded frame sequence C. As for the frame sequence B for which VAD is to be performed, the shaded frames are determined to be non-speaking periods, and the unshaded portions are determined to be speaking periods. As for the coded frame sequence C, frames with half-tone dot meshing are to be coded at a low bit rate, and frames without half-tone dot meshing are to be coded at a high bit rate. Though the frames coded at a high bit rate are sent and received at a high quality, the frames coded at a low bit rate are sent and received at a low quality.

As shown in the figure, the speech start time of the actual speaking periods is located in the middle of a frame F in the frame sequence B for which the VAD is performed. Therefore, the frame F may be determined to be a non-speaking period as shown in the figure. Consequently, a determined speech start point is behind the actual speech start point in this case. As a result, data at the starting of the actual speech may be lost.

Furthermore, as shown in FIG. 14, the voice signal S is usually characterized in that its amplitude gradually increases without a sudden large amplitude being observed at start of a speech. Therefore, it is difficult to accurately detect the starting of a speech. It may be detected more easily if a threshold for detection of a voice signal set low. However, a possibility of erroneous detection due to ambient noises will be increased. Accordingly, the threshold is required to be set high to some extent. With the threshold set high to some extent, however, it is difficult to accurately catch the starting of a speech with a small amplitude. Especially under a noisy environment, it is difficult to accurately detect the starting of a speech, because detection of a speech with VAD is difficult when speech volume is small and a voice signal is buried in noises. For the above reason, a frame corresponding to the actual starting of a speech is determined to be a non-speaking period, which causes problems such as loss of the starting of the speech and deterioration of call quality.

Furthermore, there is another problem that, under a noisy environment, a period in which a user does not utter a voice (that is, a period to be properly determined as a non-speaking period) is determined to be a speaking period due to influence from ambient noises. This causes a problem that information must be sent unnecessarily, battery life of a mobile phone is shortened, and communication channels are used unnecessarily.

If delay is permitted, there is no problem using a method of detecting a speaking period only with a voice signal. This is because a speech start point can be identified by reviewing the waveform later. For voice communication using a mobile phone, however, real-time communication is important and delay has to be as short as possible. Delay can be shortened, for example, by always transmitting a speaking signal at a high bit rate irrespective of whether a period is non-speaking or speaking and without using VAD. However, improvement of battery life of a mobile phone and effective utilization of communication channels are required, and the method without use of VAD cannot be a realistic solution. Accordingly, in order to prevent loss of the starting of a speech and deterioration of communication quality, it is necessary to perform determination of a speaking period before actual speech start time. Furthermore, in order to prevent unnecessary communication, it is necessary to properly detect a speaking period even under a noisy environment and it is desirable to detect a speaking period using a method which is not influenced by ambient noises.

Figure 15:
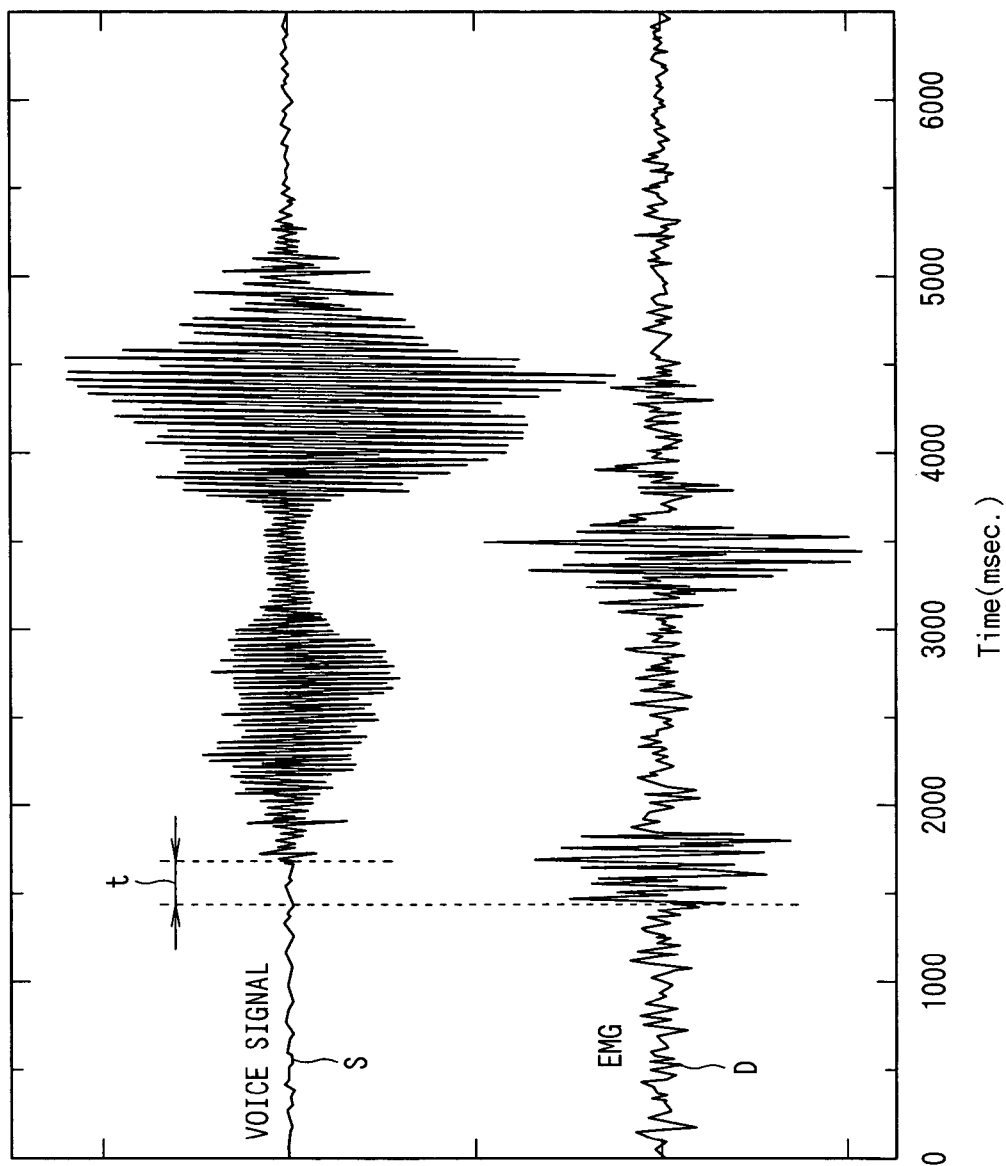
FIG. 15 shows relationship between a voice signal and an EMG.

It is generally noted that an EMG is observed ahead of a voice signal. FIG. 15 shows an example of actual observation of an EMG. The figure shows waveforms of a voice signal S and an EMG D in the case where "nana" is uttered. Referring to the figure, it is found that the EMG D is observed ahead of the voice signal S by time t.

Figure 16:
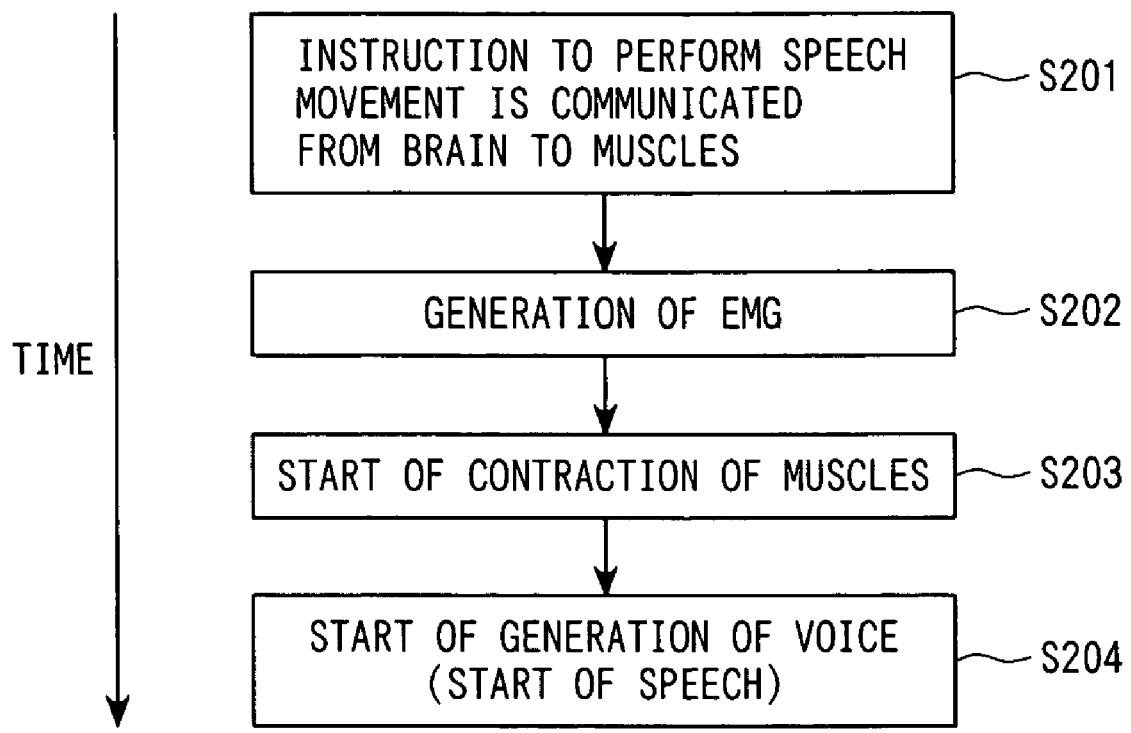
FIG. 16 shows timing of generation of an EMG and a voice signal.

FIG. 16 shows timing of generation of an EMG and a voice signal. As shown in the figure, when an instruction to perform a speech movement is communicated from a brain to muscles (step S201), an EMG is generated first (step S202), and contraction of muscles starts (step S203). Then, generation of a voice is started (step S204). Thus, a speech is started.

FIG. 17 shows timing of detection of a speaking period for an EMG and timing of processing performed on the mobile phone side. Referring to the figure, in the mechanism on the speaking human being side, the period from generation of an EMG (step S202) until start of generation of a voice (step S204) is a non-speaking period, and the period after the generation of a voice (step S204) is a speaking period.

On the speaking period detection device side, routines for measuring an EMG and detecting start of a speaking are processed (step S205) for non-speaking periods. Then start of a speech is detected by detecting generation of an EMG, and the start of a speech is notified to the mobile phone side (step S206). Then, the speaking period detection device proceeds to a routing processing for detecting termination of the speech. The termination of the speech can also be detected by the EMG.

On the mobile phone side, intermittent transmission is performed in non-speaking periods (step S208). Then, when start of a speech is notified by the speaking period detection device, a coding parameter is changed on the mobile phone side (step S209), and continuous transmission is performed in the subsequent speaking periods (step S210).

An EMG can be measured without being influenced by ambient noises. Accordingly, by detecting a speaking period using an EMG, it is possible to perform a speaking period before actual speech start time without being influenced by ambient noises.

Figure 18A:
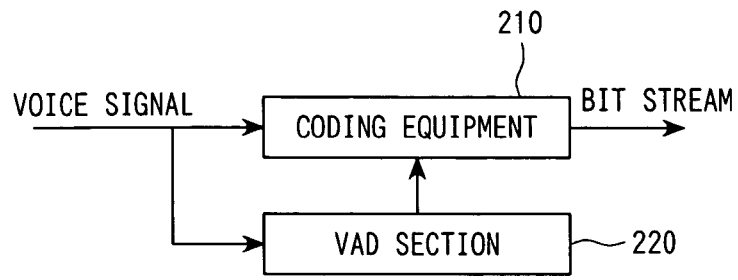
FIG. 18A shows the configuration in the case of detecting a speaking period using only VAD.
Figure 18B:
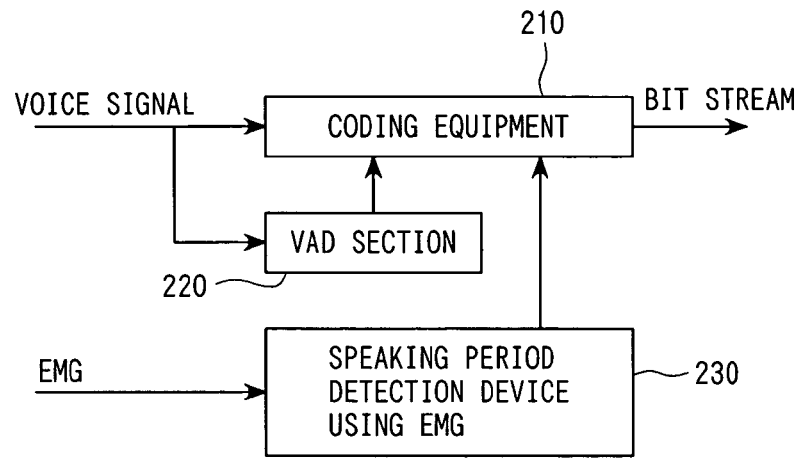
FIG. 18B shows the configuration in the case of detecting a speaking period using VAD and an EMG.

FIG. 18A shows the configuration in the case of detecting a speaking period by using only VAD, and FIG. 18B shows the configuration in the case of detecting a speaking period by using VAD and an EMG. In FIG. 18A, which corresponds to a prior-art approach, timing of coding by a coding equipment 210 for outputting bit stream with a voice signal as an input is determined by a result of detection of a speaking period by a VAD section 220. In FIG. 18B, which corresponds to an approach according to the present invention, timing of coding by the coding equipment 210 is determined not only by a result of detection of a speaking period by the VAD section 220 but also by a result of detection of a speaking period by a speaking period detection device 230 using an EMG. By detecting a speaking period as described above, unnecessary communication can be prevented and power consumption can be reduced.

Figure 19:
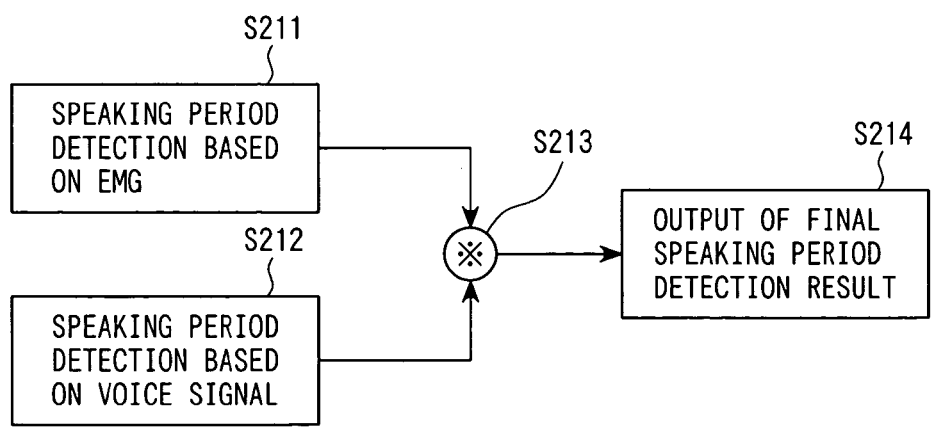
FIG. 19 shows the point where a speaking period detection processing based on an EMG and a speaking period detection processing based on a voice signal are integrated.

It is possible to detect a speaking period more robustly by combining the speaking period detection based on an EMG and the speaking period detection based on a voice signal. When movement such as yawning, coughing and moving the mouth is performed while a speech is not performed, the period correspond to it may be detected as a speaking period with a method using only an EMG. However, by combining an EMG which is not influenced by ambient noises and a voice signal which is not influenced by movements which do not lead to a speech, more robust detection of a speaking period can be possible. That is, as shown in FIG. 19, by performing an integrated processing (step S213) for integrating a speaking period detection processing based on an EMG (step S211) and a speaking period detection processing based on a voice signal (step S212), final speaking period detection result output is obtained (step S214).

In performing the integrated processing, the VAD specified in 3GPP TS26.094 can be used for the speaking period detection based on a voice signal. The following two methods can be employed for integrating the speaking period detection based on an EMG and the speaking period detection based on a voice signal.

A first method is to obtain a final detection result based on the result of speaking/non-speaking detection by each processing. In this case, only a period determined to be a speaking period by results of both processings may be finally determined to be a speaking period. Alternatively, a period determined to be a speaking period by at least one of the processings may be finally determined to be a speaking period.

A second method is to obtain a final detection result based on parameters obtained at the stage where the respective processings process a detected signal. The parameters correspond to a probability or likelihood that the period to be determined is a speaking period, and a threshold processing is performed for the parameters to detect a speaking period. For example, in the case of an EMG, the parameter is an RMS.

In the second method, the threshold processing may be performed for parameters obtained as a result of weighting and adding the parameters of both processings, or for parameters obtained as a result of multiplying the parameters of both processings together. By weighting the parameters, it is possible to specify which parameter is to be weighted more. For example, by weighting the EMG more in a noisy environment and weighting the voice signal more in an environment with few noises, the accuracy of the final detection result can be improved.

It is easy to incorporate EMG measurement means in a mobile phone. Since a mobile phone is usually used in contact with a face, it may be configured, for example, as described with reference to FIG. 7 to measure an EMG. According to the configuration, its usability is not especially deteriorated.

As described above, by using an EMG, it is possible to determine a speaking period before actual speech start time. By applying this to VAD of a mobile phone, it is possible to prevent loss of the starting of a speech and deterioration of communication quality. Furthermore, by determining a speaking period using an EMG, it is possible to determine a speaking period without being influenced by ambient noises. By applying this to VAD of a mobile phone, it is possible to perform only necessary communication without performing unnecessary communication. As a result, battery life is improved and communication channels can be effectively utilized.

(Voice Recognition Device)

In voice recognition, contents of a speech is recognized by performing a signal processing for a voice signal inputted from a microphone. Voice recognition as performed currently has a problem that accuracy of voice recognition is degraded in a noisy environment. The factors in the degradation of recognition accuracy in a noisy environment are, for example, that noises are mixed other than a voice signal concerned, and that a speaking period cannot be properly determined. As for the former factor, there has been proposed a method of modeling a voice signal in which noises are mixed.

Furthermore, there has been proposed a spectral subtraction method (hereinafter referred to as an SS method) for subtracting a noise component from a measured signal to improve accuracy of voice recognition. The SS method is described by S. F. Boll in "Suppression of acoustic noise in speech using spectral subtraction," (IEEE trans. Acoustics, Speech, and Signal Processing, Vol. 27, No. 2, pp. 113-120, 1979).

As a method of detecting a speaking period from a voice signal, there is a method of detecting it by calculating power or pitch of a signal. This method is specified in 3GPP TS26.094.

In the case of detecting a speaking period using a voice signal, it is difficult to detect a speaking period under a noisy environment. If a speaking period cannot be detected, voice recognition naturally cannot be performed. For example, if a non-speaking period is erroneously determined to be a speaking period, an insertion error (an error that an unuttered word or sentence is inserted into a recognition result) may be caused, and if a speaking period is erroneously determined to be a non-speaking period, a loss error (an error that an uttered word or sentence is not recognized) may be caused. The SS method is an approach in which subtracting a noise signal component from an observed signal in which a voice signal and a noise signal is mixed to extract only the voice signal. Though this approach is effective for recognizing a voice signal in which noises are mixed, it is naturally impossible to apply the approach if a speaking period cannot be detected.

If it is possible to detect a speaking period without being influenced by ambient noises, errors invoice recognition can be reduced. Furthermore, if it is possible to properly detect a speaking period, then the SS method can be applied more effectively, and thereby recognition accuracy can be improved. For this reason, the above-described EMG is used.

As method used in the case of combination with voice recognition, there are a method of temporarily storing voice signal data within a detected speaking period in a voice signal database to send it to a voice recognition system after the speech has ended, as shown in FIG. 11, and a method of communicating only a detected speaking period to a voice recognition system.

The former method is characterized in that one voice signal can be processed by multiple voice recognition systems and that, if determination of a speaking period performed using an EMG is erroneous, the error can be modified later and a voice signal corresponding to a proper speaking period can be communicated.

Figure 20:
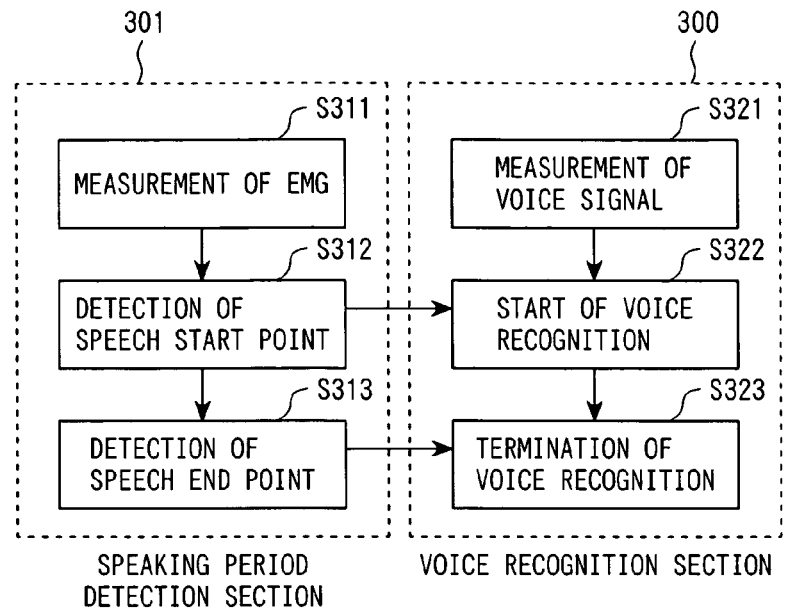
FIG. 20 shows the configuration in the case where a detected speaking period is communicated to perform a voice recognition processing.

To realize the latter method, it can be configured by a speaking period detection section 301 comprising measurement of an EMG (step S311), detection of a speech start point (step S312) and detection of a speech end point (step S313), and a voice recognition section 300 comprising measurement of a voice signal (step S321), start of voice recognition (step S322) and termination of voice recognition (step S323), as shown in FIG. 20. When the measurement of an EMG (S311) and the measurement of a voice signal (step S321) are started, voice recognition is started (step S322) if a speech start point is detected (step S312). If a speech end point is detected (step S313), the voice recognition ends (step S323). According to this process, voice recognition is performed only for a detected speaking period, so that the method is characterized in that it can be realized with less memory, the processing can be performed more lightly than the former method, and integration with an existing voice recognition system can be easily realized.

Figure 21:
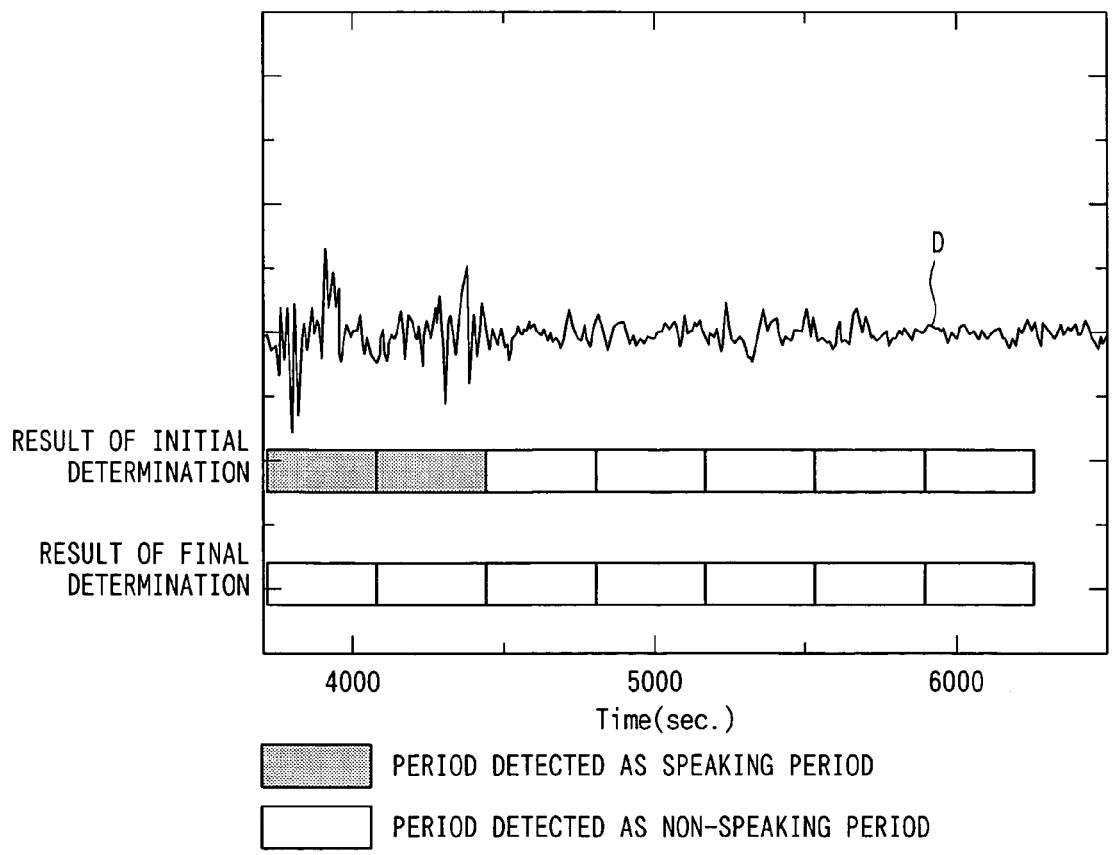
FIG. 21 shows a method for, if determination of a speaking period performed using an EMG is erroneous, modifying stored data later to detect a correct speaking period.

Description will be now made on the method in which, if determination of a speaking period performed using an EMG is erroneous, the stored data is modified later to detect a proper speaking period, with reference to FIG. 21. The figures show an EMG D when a speech is not performed and a result of determination of a speaking period for the EMG D.

When a movement such as yawning, coughing and moving the mouth is performed while a speech is not performed, a signal corresponding to the movement is mixed in the EMG D. In the figure, mixture of such a signal is recognized from the point in the vicinity of 3700 ms to the point in the vicinity of 4500 ms. If a speaking period is determined by using only the EMG D in such a case, the above-described period may be determined to be a speaking period.

In the figure, the two frames shown with half-tone dot meshing in the figure are detected to be speaking periods according to the initial determination result. However, looking back to the two frames determined to be speaking periods from the point of 6000 ms in the figure, they can be considered not to be accompanied by a speech, because the power of the voice signal corresponding to the frames determined to be speaking periods is low and the length of the periods determined to be speaking periods is short. By using other information obtained later or looking back later as described above, erroneous determination can be modified.

Criteria for such erroneous determination should be determined by the kind of task or speech concerned (for example, only consecutive numbers, natural conversation, only particular words such as place names and the like) or characteristics of a user or ambient environment (for example, inclination to cough or yawn, level of ambient noises and the like). In the figure, as a result of looking back to the periods which have been initially determined to be speaking periods later, the periods are modified to be non-speaking periods as a final determination result. Thereby, more proper detection of a speaking period can be possible.

Furthermore, as described in the section of "Application to a transmission system", it is possible to detect a speaking period not by using only an EMG but by using an EMG in combination with a voice signal.

When the present invention is applied to a mobile phone, the mobile phone can be utilized as a terminal as shown in FIGS. 8 and 9. When the present invention is applied to a head set, the head set can be configured as shown in FIGS. 22A and 22B. That is, as shown in FIG. 22A, an EMG measurement section 50 is provided for a head set 40 in which a microphone 20 and a supra-aural earphone/speaker 30 are integrated. As shown in FIG. 22B, an EMG measurement section 50 is provided for a head set 40 in which a microphone 20 and a head-phone type speaker 31 are integrated. Both of the EMGs 50 are provided with electrodes for measuring an EMG, and the electrodes are provided on the side in contact with the skin of the face of the user 100.

By employing a head set with the configuration as shown in FIGS. 22A or 22B, it is possible to detect an EMG, detect a speaking period based on the EMG and perform a voice recognition processing similarly to the cases in FIGS. 7 and 8.

If it is possible to detect a speaking period without being influenced by noises as described above, then the SS method can be effectively applied to recognition of a voice signal in which noises are mixed, and thereby improvement of accuracy of voice recognition and voice recognition with few insertion errors and loss errors can be realized.

(Signal Level Control Device)

For an occupation requiring conversation with others via telephone (especially with customers), for example, telephone appointer, it is important not to make a communication counterpart uncomfortable and not to unnecessarily leak confidential information. At a scene where multiple people with a microphone speak, for example, at a conference, at a discussion, or in a studio of a TV station, it is necessary that a voice signal to be communicated to an audience should be a high-quality voice signal with no noise mixed therein.

A point common to the two scenes is that noises caught by a microphone should not be communicated to a communication counterpart or an audience when a person having the microphone in his/her hand or with the microphone attached on him is not speaking. For example, in the case of telephone appointer, ambient noises should not be communicated when an appointer is not speaking, and contents of confidential information such as personal information should not be communicated when such information is being spoken about around the appointer. The same goes for the case of a conference, a discussion or a studio in a TV station.

In order to achieve the point, a telephone set is provided with a hold function, and a microphone provided for speakers attending at a conference or a discussion is provided with a power supply switch, for example. By turning on/off the function or the switch, unnecessary communication of noises can be prevented when speech is not being made. In a studio of a TV station, it is determined whether a different person accepts input of a microphone, and mixture of unnecessary noises is prevented by turning on a switch when the input is accepted and turning off the switch when the input is not accepted.

When it is manually set whether input from a microphone should be accepted or not as described above, the work is troublesome. As a method for performing this automatically, it is conceivable to use the above-described VAD to accept input from a microphone only while a speaking period is detected. However, the VAD for detecting a speaking period based on a voice signal has a problem that time determined by the VAD to be speech start time is behind actual speech start time, which causes delay, loss of the starting of a speech and quality deterioration. Use of VAD has also a problem that accurate detection of a speaking period is difficult because VAD is susceptible to influence from ambient noises.

By detecting a speaking period using the above EMG, it is possible to determine start of a speech before actual start time of the speech and to determine a speaking period without being influenced by ambient noises. The method for detecting a speaking period has been already described, and therefore description thereof will be omitted.

Figure 23:
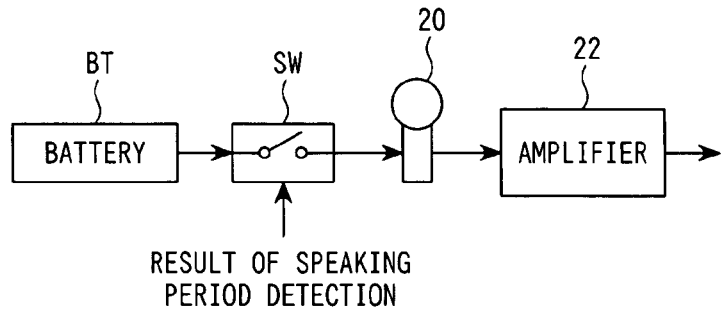
FIG. 23 shows the configuration for controlling on/off of a power supply switch of a microphone.

FIG. 23 shows the configuration for controlling on/off of a power supply switch of a microphone. In the figure, power is supplied from a battery BT to a microphone 20 via a power supply switch SW. The microphone 20 converts an inputted voice into a voice signal which is an electric signal. The voice signal outputted from the microphone 20 is communicated to an amplifier 22 and the like. In this case, on/off control of the power supply switch SW is performed based on a result of detection of a speaking period. That is, the power switch SW is controlled to be on in response to detection of a speech start point. Then, the power switch SW is controlled to be off in response to detection of a speech end point.

Figure 24:
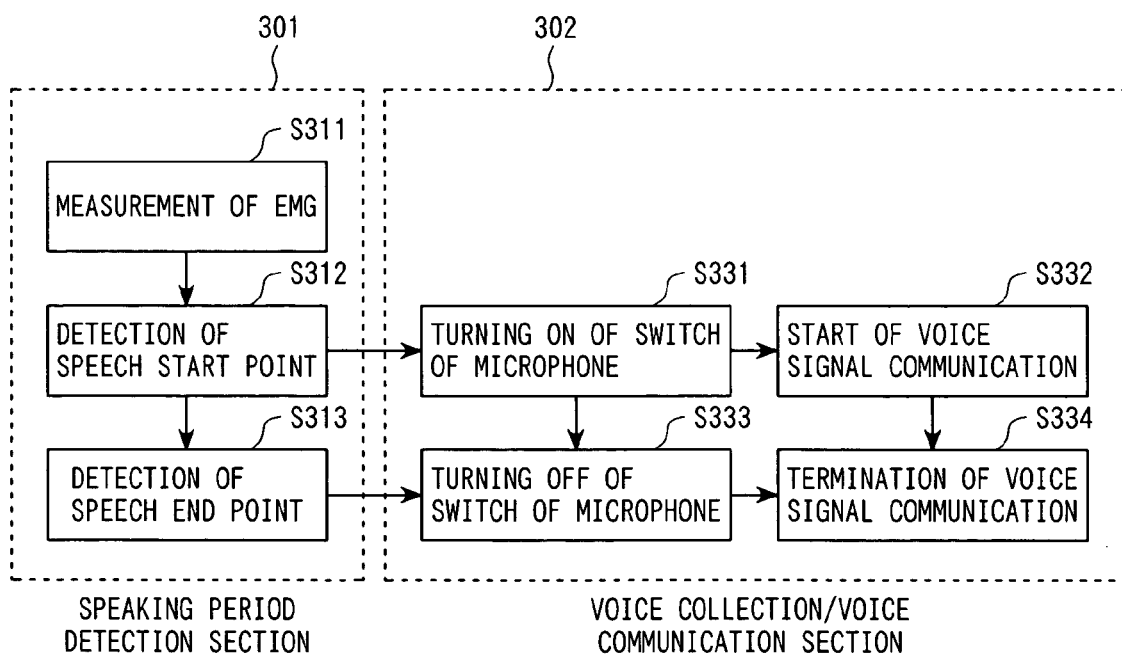
FIG. 24 shows an operational flow for controlling on/off of the power switch of a microphone.

FIG. 24 shows the above operational flow. As shown in the figure, the above operation is configured by a speaking period detection section 301 comprising measurement of an EMG (step S311), detection of a speech start point (step S312) and detection of a speech end point (step S313), and a voice collection/voice communication section 302 comprising turning on of a switch of a microphone (step S331), start of communication of a voice signal (step S332), turning off of the switch of the microphone (step S333) and termination of communication of the voice signal (step S334). When measurement of an EMG is started (step S311), and the power supply switch of the microphone is turned on (step S331) if a speech start point is detected (step S312). By the power supply switch of the microphone having been turned on, communication of a voice signal is started (step S332). On the contrary, if a speech end point is detected (step S313), the power supply switch of the microphone is turned off (step S333). By the power supply switch of the microphone having been off, communication of the voice signal is terminated (step S334).

Figure 25:
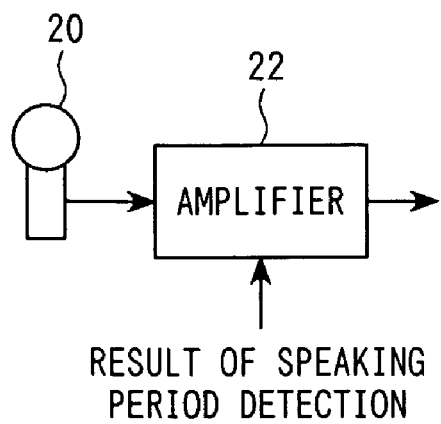
FIG. 25 shows the configuration for controlling change in gain of an amplifier for amplifying a voice signal outputted from a microphone.
Figure 26:
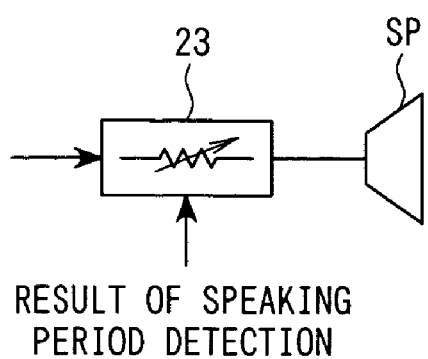
FIG. 26 shows the configuration for changing output to a speaker SP.

The power supply switch of a microphone is not necessarily turned on or off if the level of an output signal derived from the microphone is controlled based on a speaking period after all. Instead of turning on/off the power supply switch of a microphone, gain of an amplifier for amplifying an output signal from a microphone may be changed, or output to a speaker may be changed. For example, as shown in FIG. 25, in the case of controlling change in gain of an amplifier 22 for amplifying a voice signal outputted from a microphone 20, the gain of the amplifier 22 may be increased in response to detection of a speech start point and decreased in response to detection of a speech end point. As shown in FIG. 26, in the case of changing output to a speaker SP, volume set for a volume control circuit 23 maybe increased in response to detection of a speech start point and decreased in response to detection of a speech end point.

In addition to the above configurations, any configuration may be employed only if it can prevent communication of a voice corresponding to a non-speaking period to a communication counterpart or an audience. In short, if the level of an output signal derived from a microphone is controlled, and a voice corresponding to a non-speaking period is controlled not to be outputted, it will be sufficient.

In the case of applying the configuration of FIG. 23 to a mobile phone, the mobile phone can be utilized as a terminal as shown in FIGS. 8 and 9. When the configuration of FIG. 23 is applied to a head set, it is utilized as shown in FIGS. 22A and 22B.

As described above, by detecting a speaking period using an EMG, it is possible to determine start of a speech before actual start time of the speech, and determine a speaking period without being influenced by ambient noises. Thus, it is possible to obtain a high-quality voice signal with no noise mixed therein.

The present invention can be embodied in the following aspects with regard to the description of the first aspect.

(1) The speaking period detection device according to the first aspect, wherein the EMG detection means detects the EMG from electrodes which are in contact with the surface of the speaker's skin. According to this, the EMG can be detected only by contacting the electrodes with the surface of the speaker's skin.

(2) The speaking period detection device according to (1) above, wherein the electrodes are provided on a terminal used by the speaker during speech. According to this, the EMG can be detected by utilizing the terminal used by the speaker.

Generally, detection of a speaking period is important in a voice recognition processing. An approach of detecting a speaking period using only voice signals and an approach using images of movements of a speaker's mouth have been proposed. With the former, however, it is not possible to accurately detect a speaking period when the level of ambient noises is high or when multiple people are speaking at the same time. The latter is practically inconvenient because it requires a sensor such as a camera for detection of a speaking period to be set at a particular position.

According to the present invention, a speaking period is detected with the use of an EMG generated when a speaker speaks. There appears a large amplitude in an EMG as muscular activity is caused when a speaker speaks, and by perceiving the amplitude, a speaking period can be detected.

By providing electrodes for a mobile-type terminal, an EMG generated by speech can be measured from the speaker's skin. Therefore, the present invention has a high affinity with the use form of a mobile-type terminal, that is, the form of using the terminal by pressing it to the skin. A speaking period can be detected even when the level of ambient noises is high without troubles. Furthermore, it is not necessary to provide a sensor at a particular position.

If a voice recognition processing is performed based on a detected speaking period, recognition accuracy can be improved. Furthermore, if a coding processing is performed based on a detected speaking period, power consumption can be reduced, and battery life of a mobile communication terminal including a mobile phone can be improved. Furthermore, by controlling the level of an output signal derived from a microphone based on a detected speaking period and controlling a voice corresponding to a non-speaking period not to be outputted, a high-quality voice signal with no noise mixed therein can be obtained.

What is claimed is:

1. A speaking period detection device comprising:
   an electromyography (EMG) detection unit for detecting an EMG from a pair of electrodes provided on a portion of the case of a terminal used by a speaker for speaking, the portion being in contact with the speaker's skin while the speaker is speaking;
   a speaking period detection unit for detecting a speaking period a value obtained from a feature amount extracted from the EMG detected by the EMG detection unit with a predetermined threshold to detect a speech start timing and a speech end timing of the speaking period; and
   a counter for counting the result of the comparison of the value obtained from the feature amount with the predetermined threshold,
   wherein the speaking period detection unit determines the speaking period only when a count value of the counter exceeds a predetermined value, and
   wherein the feature amount is any one of a root mean square (RMS) value, an average relative variation (ARV) value, an integrated electro muscle graphy (iEMG), a frequency spectrum of an EMG, and the number of crossings with a threshold value.

2. The speaking period detection device according to claim 1, further comprising a storage unit for saving a speaking voice signal of the speaker; wherein saving of the speaking voice signal is started at the speech start timing and ended at the speech end timing.

3. A voice recognition processing device comprising a voice recognition processing unit for performing a voice recognition processing for a speaking voice signal corresponding to the speaking period detected by the speaking period detection device according to claim 1.

4. A voice recognition processing device comprising a voice recognition processing unit for performing a voice recognition processing for a speaking voice signal stored in a storage unit included in the speaking period detection device according to claim 1.

5. A transmission system for performing a coding processing for a speaking voice signal corresponding to the speaking period and transmitting the coded voice signal, the transmission system comprising a coding processing timing determination unit for determining timing of the coding processing based on the speaking period detected by the speaking period detection unit according to claim 1.

6. A signal level control device for controlling a level of an output signal derived from a microphone, the signal level control device comprising a control unit for controlling the level of the output signal based on the speaking period detected by the speaking period detection unit according to claim 1, and controlling a voice corresponding to a non-speaking period not to be outputted.

7. A speaking period detection method comprising:
   detecting an electromyography (EMG) from a pair of electrodes provided on a portion of the case of a terminal used by a speaker for speaking, the portion being in contact with the speaker's skin while the speaker is speaking;

detecting a speaking period, by comparing a value obtained from a feature amount extracted from the EMG detected with a predetermined threshold to detect a speech start timing and a speech end timing of the speaking period; and counting the result of the comparison of the value obtained from the feature amount with the predetermined threshold, wherein the speaking period is determined only when a count value of the counter exceeds a predetermined value, and wherein the feature amount is any one of a root mean square (RMS) value, an average relative variation (ARV) value, an integrated electro muscle graphy (iEMG), a frequency spectrum of an EMG, and the number of crossings with a threshold value.

8. A mobile terminal comprising:

a speaking period detection device; and a pair of electrodes provided on a portion, of the mobile terminal, in contact with a facial skin surface of a speaker who is speaking, the speaking period detection device comprising:

an electromyography (EMG) detection unit for detecting an EMG from the pair of electrodes;

a speaking period detection unit for detecting a speaking period, by comparing a value obtained from a feature amount extracted from the EMG detected by the EMG detection unit with a predetermined threshold to detect a speech start timing and a speech end timing of the speaking period; and a counter for counting the result of the comparison of the value obtained from the feature amount with the predetermined threshold, wherein the speaking period detection unit determines the speaking period only when a count value of the counter exceeds a predetermined value.

9. The mobile terminal according to claim 8, further comprising a voice activity detector (VAD) for determining presence or absence of a voice while the speaker is speaking, wherein the detection of the speaking period based on an EMG signal and the detection of the speaking period based on a voice signal with the use of the VAD are integrated.

\* \* \* \* \*

UNITED STATES PATENT AND TRADEMARK OFFICE
CERTIFICATE OF CORRECTION

PATENT NO. : 7,627,470 B2 Page 1 of 1
APPLICATION NO. : 10/939566
DATED : December 1, 2009
INVENTOR(S) : Manabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1096 days.

Signed and Sealed this

Twenty-first Day of December, 2010

David J. Kappos
*Director of the United States Patent and Trademark Office*